United States Patent
Schulkins

(10) Patent No.: US 7,212,995 B2
(45) Date of Patent: May 1, 2007

(54) LOAN UNDERWRITING SYSTEM AND METHOD

(75) Inventor: Bruce Joseph Schulkins, Wilmington, DE (US)

(73) Assignee: TransUnion L.L.C., Wilmington, DE (US)

( * ) Notice: Subject to any disclaimer, the term of this patent is extended or adjusted under 35 U.S.C. 154(b) by 329 days.

(21) Appl. No.: 10/452,402

(22) Filed: Jun. 2, 2003

(65) Prior Publication Data

US 2004/0243509 A1 Dec. 2, 2004

(51) Int. Cl.
*G06Q 40/00* (2006.01)
(52) U.S. Cl. .......................... 705/35; 705/38
(58) Field of Classification Search ........... 705/35, 705/38
See application file for complete search history.

(56) References Cited

U.S. PATENT DOCUMENTS

| | | | |
|---|---|---|---|
| 5,781,773 A * | 7/1998 | Vanderpool et al. ........ 707/100 |
| 5,991,745 A * | 11/1999 | Kiritz ........................ 705/38 |
| 6,609,118 B1 * | 8/2003 | Khedkar et al. ............ 705/36 R |
| 6,988,082 B1 * | 1/2006 | Williams et al. ........... 705/36 T |
| 2001/0029482 A1 * | 10/2001 | Tealdi et al. ................ 705/38 |
| 2001/0039506 A1 * | 11/2001 | Robbins ...................... 705/10 |
| 2001/0047326 A1 * | 11/2001 | Broadbent et al. ........... 705/38 |
| 2002/0002494 A1 * | 1/2002 | Beam et al. .................. 705/20 |
| 2002/0099650 A1 * | 7/2002 | Cole ........................... 705/38 |
| 2003/0149658 A1 * | 8/2003 | Rossbach et al. ........... 705/38 |
| 2004/0019517 A1 * | 1/2004 | Sennott ....................... 705/10 |
| 2004/0059653 A1 * | 3/2004 | Verkuylen et al. ........... 705/35 |
| 2004/0117296 A1 * | 6/2004 | Ellison ........................ 705/38 |

OTHER PUBLICATIONS

Appraisers Are Learning to Live with Black-Box Technology (Automated Valuation Models (AVMs) Could Put Independent Real Estate Appraisers Out of Business), Mar. 24, 2000, American Banker, vol. 165, No. 58, p. 3A.*
Grant, Rick, Advances in Collateral Valuation; The Appraisal Process Is the Next Frontier in the Quest to Speed Up the Loan Originiation Process. Technology Is Taking Us There, Aug./Sep. 2002, Mortgage Technology, p. 24.*
Stewart Mortgage Information Introduces ValuLogix, a Unique AVM Tool, Mar. 6, 2003, PR Newswire (US).*
"First American Equity Loan Services Alternative Valuation Products Summary".
"Basis100 Launches BasisValues".
"A Smarter Source for Property Valuations".

* cited by examiner

*Primary Examiner*—James A. Kramer
*Assistant Examiner*—James M. Alpert
(74) *Attorney, Agent, or Firm*—Wood, Phillips, Katz Clark & Mortimer

(57) ABSTRACT

An automated loan underwriting system and method automates the logic implemented by a loan underwriter, saving the loan originator time and money. Each lending institution can set up its own decisioning criteria, enabling customers to customize the process in which a proper evaluation, owners and encumbrance report, or title product is selected for a loan application within a given set of characteristics. The system and method allow for the automatic upgrading to another product without involvement of the loan processor, helping to reduce time delays in the loan origination process. The speed and automation allow for more underwriting checks to be applied against each loan.

25 Claims, 21 Drawing Sheets

LOAN UNDERWRITING SYSTEM AND METHOD

BACKGROUND OF THE INVENTION

The process of applying for a loan, such as a mortgage loan, can be time consuming and costly. Moreover, each loan underwriter may have its own decisioning criteria resulting in nonuniformity in the decision making process both universally and within any particular loan originator.

There are two basic types of processes that have been used by loan processors. These are a manual process of decisioning logic and a partially automated process for decisioning logic.

In the first conventional process, a lending institution has pre-established rules for underwriting product selection. Loan processors handle each application manually. When a loan request is received from a borrower it sits in queue until the loan processor gets to it. The loan processor manually interprets the decisioning logic established by the lending institution to determine the appropriate products to be ordered. The loan processor then generates a request for an automated valuation model (AVM) or a manual product such as a drive by valuation or a full appraisal. When the completed product is returned to the loan processor, usually via fax or electronically, it again sits in queue until it gets to the top of the list. At that point, the product is reviewed against underwriting guidelines. If the lender requires an additional or supplemental product, the lender sends the request back to the vendor and the process repeats.

The manual process can be problematic from an efficiency and accuracy standpoint. Time delays are inherent in the process. Time is wasted every time the loan application or product work sits in queue until the loan processor is able to handle it. Other time delays occur when the borrower is deciding whether or not to order a supplemental or additional product. Since that decision involves a manual review, more time elapses than is necessary.

Moreover, there is not certainty that the loan processor will use or interpret the lending institution's logic correctly. A mistake of this kind may go unchecked, and the product that the lending institution decided should be ordered might not be the product that is actually ordered. A loan processor may intentionally decide to break company policy and choose whichever product seems appropriate at the time, regardless of the lending institutions established rules and risk guidelines. These problems result in wasted time and money, and increase the amount of time between when the application is made and closing of the loan. These problems can also expose the lender to greater risk based on inaccurate underwriting decisions being made.

The second type of process automates some of the decisioning logic. In these types of systems, the lending institution automates a part of the product ordering process. For instance, a loan processor might have the ability to input just a few of the elements of information about the borrower or property into an automated decisioning logic system. This information might include credit tier, geographic location and loan amount. When the loan processor enters this information the system returns the name of a product, or perhaps the names of several products, which then have to be sorted through manually by the loan processor. Thereafter, the loan processor must order the product by sending the information to an AVM vendor or a vendor in the field for a manual product. While the second type of process is more advanced, and decreases the inaccuracies, it still may have problems. Only a few determinates are used to determine the appropriate products to order. This system does not allow for more specific differences between properties that might aid in determining product selection. Also, recent changes to lenders risk policy may not have been received by the underwriting.

The present invention is directed to solving one or more of the problems discussed above, in a novel and simple manner.

SUMMARY OF THE INVENTION

In accordance with the invention, there is provided an automated loan underwriting system and method. The system and method automates the logic implemented by a loan underwriter, saving the loan originator time and money. Each lending institution can set up its own decisioning criteria, enabling customers to customize the process in which a proper evaluation, owners and encumbrance report, or title product is selected for a loan application within a given set of characteristics. The system and method allow for the automatic upgrading to another product without involvement of the loan processor, helping to reduce time delays in the loan origination process. The speed and automation allow for more underwriting checks to be applied against each loan.

The system and method performs numerous enhancement functions. The system and method serves as a quality control tool in that it ensures valid loan and property characteristics input by a lender. This reduces downstream origination problems due to missing data. The system and method ensure that the lender selects the most economically sound product the first time, streamlining the process and saving money for lenders and its clients. Moreover, the system and method ensures the loan processors order consistent underwriting products for similar applications, lending reliability to the product.

Further features and advantages will be readily apparent from the specification and from the drawings.

DETAILED DESCRIPTION OF THE INVENTION

Figure 1:
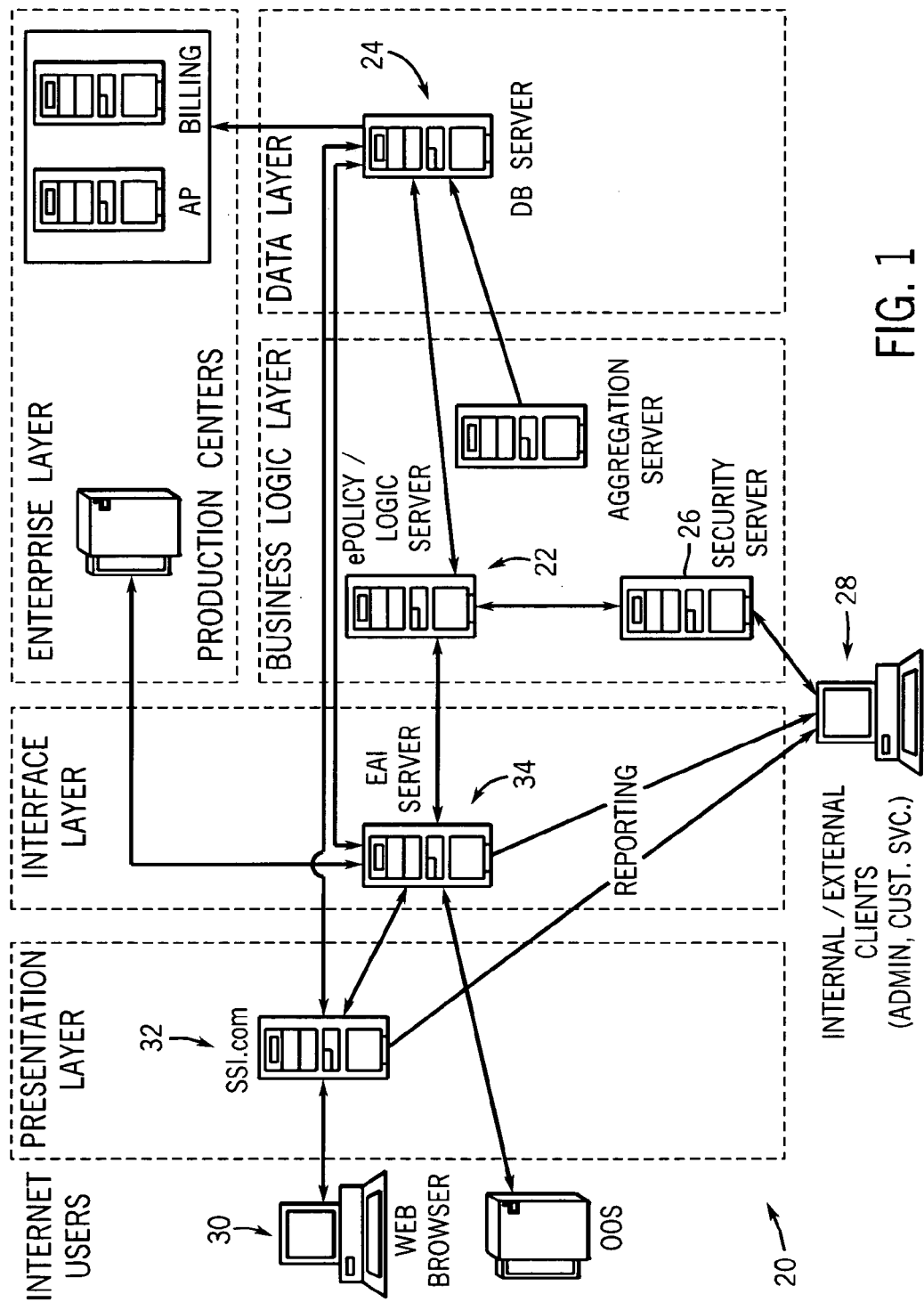
FIG. 1 is an infrastructure diagram showing relationship of various servers used for implementing the system and method in accordance with the invention.

The system and method in accordance with the invention uses tables to map the decisioning logic to be used by a lender to order valuation and title products. These tables utilize criteria that is not practical in a manual or semi-automated system. Particularly, the lender's logic is translated into a utilizable format by the table. The tables are entered into the system and accessed as each product is ordered, at which time the system uses them to select the appropriate product for the borrower's set of characteristics taking into account the lender's specific decisioning criteria. These tables can be dynamically updated at any time and then become immediately available.

The following describes how the system and method in accordance with the invention reads a table for valuation products:

Step One—Identify what information is passed on to the system provider for a given product request.
    Are both property type and owner occupancy fields given?
    Is just the property type given?
    Is just owner occupancy given?
    Is just loan amount given?
    Is just estimated value given?

Step Two—Find the row on the ePolicy table that matches the information provided in the request. Rows are compared in order, based on the most inclusive data match to the least inclusive, or general.
    If risk tier, property type, and owner occupancy fields are given:
        Look for the row with matching requested product type, property type, owner occupancy, and:
            Matching risk tier, state, and county
            Matching risk tier, state, and no county
            Matching risk tier, no state, and no county
    If risk tier and property type are given:
        Look for the row with matching requested product type, property type, no owner occupancy, and:
            Matching risk tier, state, and county
            Matching risk tier, state, and no county
            Matching risk tier, no state, and no county
    If just owner occupancy is given:
        Look for the row with matching requested product type, owner occupancy, no property type, and:
            Matching risk tier, state, and county
            Matching risk tier, state, and no county
            Matching risk tier, no state, and no county
        Look for the row with matching requested product type, no risk tier, no property type, no owner occupancy, and:
            Matching state, county
            Matching state, no county
            No state, and no county
    Return NAK (negative acknowledgment), causing the providers Workflow System to cancel the order
    If no risk tier is given by the lender, default to the first risk tier Step Three—When the correct row is accessed according to the above rules, order the valuation product on that row under the correct risk tier.

For understanding the terms used in the tables herein, the following glossary is provided:

AVM (Automated Valuation Model)—Automated valuation models are powered by computer software to analyze real estate data using an automated process. The end result of an AVM report is an estimated current market value of the subject property. Other property specifics, comparable property listings, and a confidence indicator for the estimated market value on the report provide a quick snapshot of the property and accuracy of the valuation. Commercially available exemplary AVMs referenced herein include Freddie Mac's HVE (Home Value Explorer), Basis100's HPA (Home Price Analyzer), and Case Schiller Weiss' CASA (Characteristics and Sales Analysis).

"No hit" is returned to the lender if a "hit" (estimated current property value) cannot be found using an automated valuation model (or series of AVMs if the lender's decisioning logic calls for cascading AVMs).

Owner Occupancy—In a table, the column for owner occupancy has four possible entries. "P" stands for primary, "S" stands for secondary, and "R" stands for rental. The space can also be left blank.

Property Type—In a table the column for property type has six possible entries. "S" stands for a single-family residence, "2" stands for a 2–4 family residence, "M" stands for a mobile home and lot, "C" stands for a condo, and "R" stands for a residential lot. The sixth possibility is that the space is left blank.

PS (epolicy Selected)—(ePolicy is a service mark of the assignee of the present application.) PS is an item type in the tables indicating that the loan originator wishes to pass information to the system and method herein for a given product request. The system and method then accesses the appropriate table for the given lender and automatically determines the appropriate product to be ordered.

The following Table 1 is a sample of a type of table currently in use for valuation product selection.

TABLE 1

| Re-quested Product Type | State | Owner Occupied | Property Type | Risk Tier One | Risk Tier Two | Risk Tier Three | Risk Tier Four | Risk Tier Five |
|---|---|---|---|---|---|---|---|---|
| PS | | S | | HVE-HPA-CASA-AVE | AVE | AVI | URAR | URAR |
| PS | | R | | AVI | AVI | AVI | URAR | URAR |
| PS | | P | S | HVE-CASA-HPA-AVE | HVE-CASA-HPA-AVE | HVE-CASA-HPA-AVE | HVE-CASA-HPA-URAR | URAR |
| PS | | P | R | LAPP | LAPP | LAPP | LAPP | LAPP |
| PS | | P | M | AVI | AVI | AVI | URAR | URAR |
| PS | | P | C | AVE | AVE | AVE | URAR | URAR |
| PS | | P | 2 | AVI | AVI | AVI | URAR | URAR |
| 2055 | | | | 2055 | 2055 | 2055 | URAR | URAR |
| 2055I | | | | 2055I | 2055I | 2055I | URAR | URAR |
| LAPP | | | | LAPP | LAPP | LAPP | LAPP | LAPP |

TABLE 1-continued

| Re-quested Product Type | State | Owner Occupied | Property Type | Risk Tier One | Risk Tier Two | Risk Tier Three | Risk Tier Four | Risk Tier Five |
|---|---|---|---|---|---|---|---|---|
| AVE | | | | AVE | AVE | AVE | URAR | URAR |
| URAR | | | | URAR | URAR | URAR | URAR | URAR |
| AVM | | | | HVE-CASA-AVE | HVE-CASA-AVE | HVE-CASA-AVE | HVE-CASA-URAR | URAR |
| AVI | | | | AVI | AVI | AVI | URAR | URAR |
| BPO6 | | | | BPO6 | BPO6 | BPO6 | URAR | URAR |
| PS | NM | R | 2 | 2055I | 2055I | 2055I | URAR | URAR |
| PS | NM | R | | 2055I | 2055I | 2055I | URAR | URAR |
| PS | NM | P | S | HVE-HPA-2055 | HVE-HPA-2055 | HVE-HPA-2055 | HVE-HPA-URAR | URAR |
| PS | NM | P | C | 2055 | 2055 | 2055 | URAR | URAR |
| PS | NM | P | 2 | 2055I | 2055I | 2055I | URAR | URAR |
| PS | NM | | M | 2055I | 2055I | 2055I | URAR | URAR |
| AVM | NM | | | HVE-CASA-2055 | HVE-CASA-2055 | HVE-CASA-2055 | HVE-CASA-URAR | URAR |
| AVI | NM | | | 2055I | 2055I | 2055I | URAR | URAR |
| AVE | NM | | | 2055 | 2055 | 2055 | URAR | URAR |

This table, including the product type "PS", indicates that the lender, in some instances, passes loan application characteristics so that the ePolicy system selects the appropriate product based on the lender's specific criteria. Specific products and cascading AVMs are represented under the various risk tier categories. A cascading AVM identifies a sequence of AVMs. A first AVM in the sequence is ordered. If that AVM does not result in a hit, then the system orders the next AVM in the sequence. This process continues until a hit is found, or an upgrade to a manual product occurs, or a no hit message is returned at the end of the sequence, depending on the particular situation.

In the exemplary table, the lender has indicated the different decisioning logic should be followed for different owner occupancies and different property types. "NM" is included in the state heading on some rows. If the property for which the product is being ordered is located in New Mexico, then these rows apply. By way of example, if a lender wants to select an appropriate product to value an owner occupied condominium in New Mexico, and the borrower is in credit tier three, then using the above specified criteria for finding a row on a table that matches the information provided, the system will select the 19th row that reads (left to right):

PS, NM, P, C, 2055, 2055, 2055, URAR, URAR

Following this row over to the risk tier three column, the system finds that the product to be ordered is a type 2055 drive-by appraisal.

Figure 2:
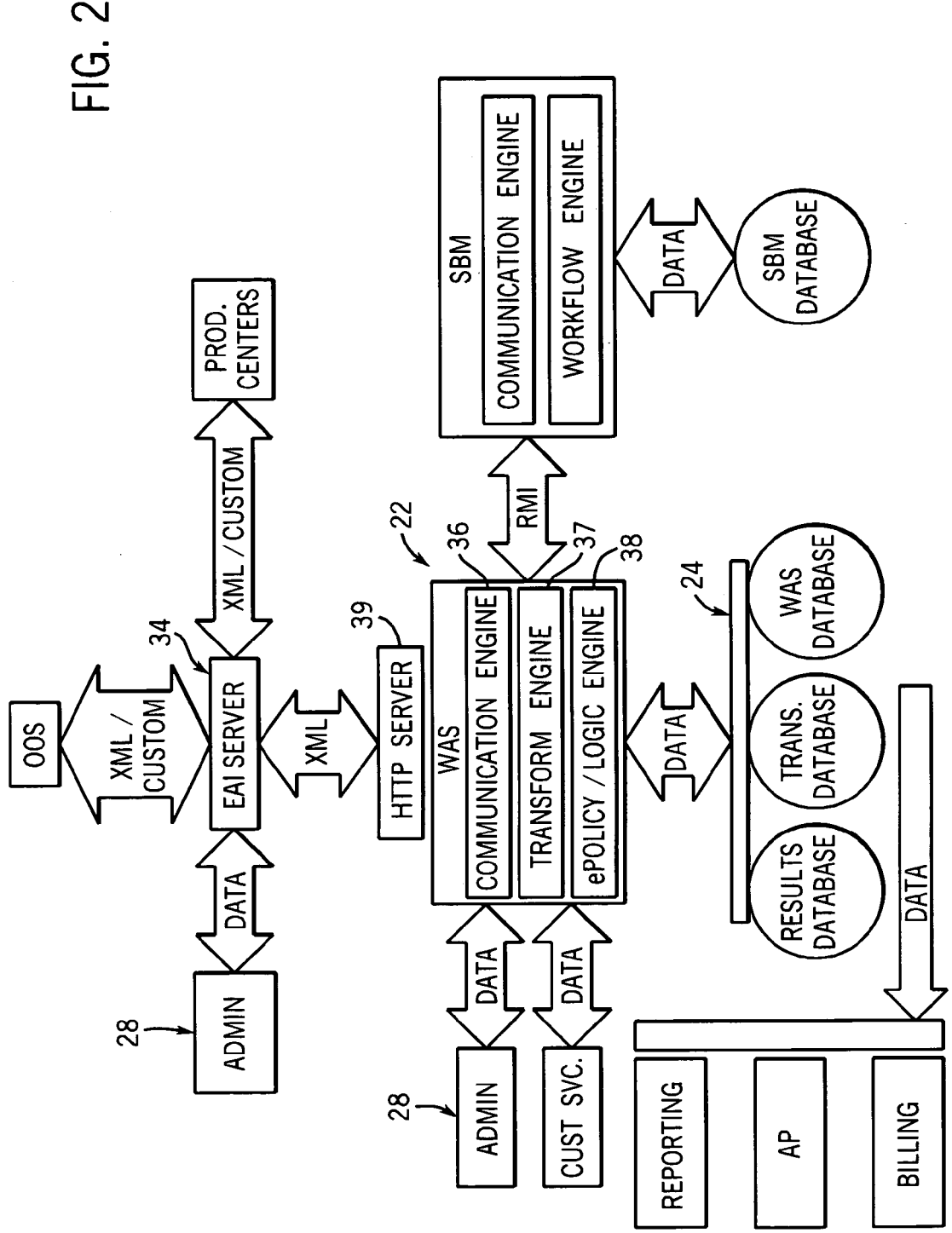
FIG. 2 is a block diagram illustrating data flow for the high level software architecture of the system of FIG. 1.

The system and method for loan underwriting in accordance with the invention is initially described with reference to FIGS. 1 and 2. FIG. 1 illustrates an infrastructure diagram for a loan underwriting system 20 in accordance with the invention. The infrastructure diagram identifies various layers involved in the system 20. FIG. 2 is a block diagram illustrating data flow for the high level software architecture of the system 20. Particularly, the system 20 is used by or for lenders, underwriters, or the like, for implementing a method for loan underwriting.

A business logic layer includes an ePolicy/logic server 22 for implementing the basic logic for the loan underwriting system 20. The logic server 22 communicates with a database server 24 of a data layer which stores customer data, including tables to be used by the logic server 22. The logic server 22 also communicates with a security server 26 which is accessed by internal/external client 28 providing a user interface for the loan underwriting system 20. Alternatively, a web browser personal computer 30 can communicate via a web server 32 which in turn communicates through an EAI server 34 with the logic server 22. The web server 32 and EAI server 34 also communicate directly with the internal/external clients PC 28, as illustrated. Other servers perform conventional functions not specifically related to the present invention.

As shown in FIG. 2, the logic server 22 includes a communication engine 36, a transform engine 37 and an ePolicy/logic engine 38. The communication engine 36 communicates with other servers, such as the EAI server via an HTTP server 39. The ePolicy/logic engine implements the decisioning logic. The transform engine 37 transforms data between the providers format used in the ePolicy/logic engine 38 and formats used in the other servers.

While the infrastructure diagram illustrates various different servers for implementing the loan underwriting system and method in accordance with the invention, more or fewer servers can be used, as necessary or desired to satisfy customer requirements.

In accordance with the invention, the loan underwriting system 20 implements software in the logic server 22 to implement lender decisioning logic. This logic uses modified tables for enhancing functionality of the loan underwriting system 20. The enhancements include added criteria used for valuation product selection, utilizing confidence scores to dynamically enhance valuation determination and post processing logic.

The following Table 2 is a sample policy table which utilizes additional criteria in the form of estimated property value and loan amount to enhance valuation determination.

TABLE 2

| Requested Product Type | State | County | Est. Value | Est. LTV** | Loan Amt>= | Loan Amt<= | Risk Tier One | Risk Tier Two | Risk Tier Three | Risk Tier Four | Risk Tier Five |
|---|---|---|---|---|---|---|---|---|---|---|---|
| AVM | | | | | 0 | 250000 | HVE-CASA-HPA-AVE | HVE-CASA-HPA-AVE | HVE-CASA-HPA-AVE | AVI | AVI |
| AVM | CA | | | | 0 | 300000 | HVE-HPA-AVE | HVE-HPA-AVE | HVE-HPA-AVI | URAR | URAR |
| AVM | CA | | | | 300001 | 550000 | HPA-CASA-AVE | HPA-CASA-AVI | HPA-CASA-2055 | 2055 | 2055 |
| AVM | CA | | | | 550001 | | 2055I | 2055I | URAR | URAR | URAR |
| AVM | PA | | | | 0 | 250000 | HPA-HVE-CASA-NOHIT | HPA-HVE-CASA-NOHIT | HPA-HVE-CASA-NOHIT | AVE | AVI |
| AVM | PA | PHILA | | | 0 | 250000 | CASA-HVE-HPA-AVI | CASA-HVE-AVI | CASA-2055 | AVE | AVI |
| AVM | PA | BUCKS | | | 0 | 250000 | HVE-HPA-AVE | HVE-HPA-AVE | HVE-HPA-AVE | AVI | AVI |
| AVM | PA | CHESTER | | <80 | 0 | 250000 | HVE-AVE | HVE-NOHIT | HVE-NOHIT | AVE | AVI |
| AVM | PA | BERKS | >150000 | | 0 | 250000 | HVE-HPA-2055 | HVE-HPA-2055 | HVE-HPA-2055 | 2055 | URAR |
| AVM | PA | CARBON | <400000 | >90 | | | HVE-HPA-2055 | HVE-HPA-2055 | HVE-HPA-2055 | 2055 | URAR |
| PS | | | >250000 | | | | AVI | AVI | URAR | URAR | URAR |

Table 2 is utilized where its appropriate to select products based on the amount of money being borrowed or when the estimated value of the property is a certain dollar amount. There are two ways in which the estimated value of a property is used in Table 2. Under the "estimated value" heading, a number representing the estimated value is given. Under the "estimated LTV" heading, a number representing the loan amount divided by the estimated dollar value of the property is given.

As an example, a property in Carbon County, Pennsylvania needs to be valued and the lender wants to use a cascading AVM to do so. The estimated value of the property is $475,000. The requested loan amount is $200,000, making the estimated LTV ratio 0.42. The borrower is in risk tier 1. The system 20 first looks at the most restrictive row on the table. The only row that contains the correct item type, state and county is the second to last row in the table. This row cannot be used, however, since the estimated value of the property is higher than the limit established in the table. The system 20 then looks for a row that is slightly less restrictive. In other words, in this example, a row with correct state, item type, estimated value, estimated LTV, and loan amount, but a blank in the county column. The fifth row satisfies this requirement. In this row, the product in the risk tier 1 column is HPA-HVE-CASA-no hit. The logic will cascade through the three AVMs in the order listed, stopping if it finds a hit. If the system cannot find a hit with any of the three products than a no hit message is returned to the lender.

The following table 3 illustrates the use of AVM confidence scores. In this table several sets of cascading AVMs are established for different loan amounts, and, in some cases, a specified estimated LTV ratio or estimated value.

TABLE 3

| Requested Product Type | State | Cnty | Estimated Value | Estimated LTV ** | Loan Amt>= | Loan Amt<= | Risk Tier One | Risk Tier Two | Risk Tier Three | Risk Tier Four | Risk Tier Five |
|---|---|---|---|---|---|---|---|---|---|---|---|
| AVM | | | | | 0 | 250000 | HVE:L-CASA:E-HPA:40-AVE | HVE:L-CASA:E-HPA:40-AVE | HVE:M-CASA:D-HPA:60-AVE | HVE:H-CASA:C-HPA:80-AVE | AVI |
| AVM | | | | | 250001 | 300000 | HVE-HPA-AVE | HVE-HPA-AVE | HVE:H-CASA:C-HPA:80-AVE | AVE | AVI |
| AVM | | | | | 300001 | 550000 | HPA-CASA-AVE | HPA-CASA-AVI | HVE:H-CASA:B-HPA:90-AVE | AVI | URAR |
| AVM | | | 1000000 | | 550001 | | 2055I | 2055I | URAR | URAR | URAR |
| PS | | | | <80 | | 50000 | HVE-CASA-HPA-AVE | HVE-CASA-HPA-AVE | HVE-CASA- | HVE:H-CASA:C- | AVE |

TABLE 3-continued

| Requested Product Type | State | Cnty | Estimated Value | Estimated LTV ** | Loan Amt>= | Loan Amt<= | Risk Tier One | Risk Tier Two | Risk Tier Three | Risk Tier Four | Risk Tier Five |
|---|---|---|---|---|---|---|---|---|---|---|---|
| PS | | | >250000 | | | | AVI | AVI | HPA-AVE URAR | HPA:80-AVE URAR | URAR |

Table 3 differs, in pertinent part, from Table 2 through the use of AVM confidence scores. The exemplary AVM returns a score indicating how confident the vendor is that the value returned is within a certain amount of the actual value of the property. The HVE systems provides an accuracy indicator that is a system of degrees. A high "H" confidence score indicates that the valuation of the property is at least as accurate as an appraisal. It is defined as having a standard deviation of less than or equal to 13%. A medium "M" score is somewhat less accurate than an appraisal, with the standard deviation lying between 13% and 20%. A low "L" confidence score occurs when the valuation is significantly less accurate than an appraisal. The standard deviations being between 20% and 30%. HVE will not return an estimate if it is less accurate than 30%. The HPA system uses a numerical confidence scoring system to measure the likelihood of the estimated market value following within plus/minus 10% of the true value. A higher score indicates a more reliable estimate. For example, a score of 90 means that 90 out of 100 observations from the same price tier and geographic areas would be expected to have an area of less than 10 percent. The CASA system expresses confidence grades as one of five letters, "A" for highest predicted accuracy through "E" for lowest predicted accuracy, with each confidence grade corresponding to a predicted value range. Grade A is within 6%, grade B 6% to 8%, grade c, 8% to 10%, grade D 10% to 14%, and grade E 14% to 20%.

Table 3 supplies a minimum confidence score for many of the AVMs, especially in higher risk tiers. A confidence score below the minimum in a cascading situation causes the system 20 to move on to the next AVM in the sequence, much like when an AVM returns a no hit when no minimum confidence score is given.

policy table. Therefore, any type of property will use the same decisioning criteria, namely, product selection will be based on item type, risk tier, and sometimes loan amount, estimated value or estimated LTV. As an example, a buyer in risk tier three wants a $280,000.00 loan. The primary residence is a single-family house in Worcester County, Mass. The lender wants to value the home using a cascading AVM. The row that satisfies an AVM type would contain a loan amount of $280,000.00 is the second row, which dictates that the row is to be used when the loan amount is between $250,001.00 and $300,000.00 inclusive. In this row, the valuation products in risk tier three are as follows:

HVE:H
CASA:C
HPA:80
AVE

The system 20 cascades through these products in order. The HVE is tried first. If the confidence score is high, then the product is returned to the lender. If it is medium or low, then the system 20 cascades to the next product, CASA. If CASAs confidence grade is C or higher, that value found is returned. If not, the system 20 will try HPA. A score of 80 or above is needed to accept HPAs value. Anything below that, and the system 20 will order an AVE which is a drive-by valuation.

The following Table 4 shows the logic that the system 20 uses once a product is already returned to the lender. This table is used to decide what upgrade type products should be ordered, based on prior item type, variance of the returned value to the estimated value, derived LTV, value returned, and loan amount.

TABLE 4

| Prior Product Type | State | County | % or $ Variance to Est Value | Derived LTV | Value Returned> | Value Returned< | Loan Amt>= | Loan Amt<= | Risk Tier One | Risk Tier Two | Risk Tier Three | Risk Tier Four | Risk Tier Five |
|---|---|---|---|---|---|---|---|---|---|---|---|---|---|
| HVE-HPA-CASA-AVE | | | | | 400000 | | | | 2055I | URAR | URAR | URAR | URAR |
| HVE-HPA-CASA-AVE | CA | | | | 550000 | | | | 2055I | URAR | URAR | URAR | URAR |
| HVE-HPA-CASA | | | 25% | <85 | | | | | AVE | AVE | AVE | AVI | AVI |
| HVE-HPA-CASA | | | 25% | >85 | | | | | AVI | AVI | URAR | URAR | URAR |
| HVE-HPA-CASA | | | $15,000 | | 50000 | 200000 | | | AVE | AVE | AVE | AVI | AVI |
| HVE-HPA-CASA | | | $30,000 | >85 | 200001 | | | | AVE | AVE | AVE | AVI | AVI |
| AVE | | | 15% | <95 | | | 60000 | | AVI | AVI | AVI | AVI | AVI |
| AVI | | | 15% | <95 | 250000 | | | | URAR | URAR | URAR | URAR | URAR |

In this example, state, county, owner occupancy, and property type are not important to the lender using this As an example, the prior item type is HVE-HPA-CASA and the returned value of the Pennsylvania property was $225,000.00, the estimated value is $260,000.00, the loan amount is $200,000.00 and the borrower is in risk tier 4. The sixth row satisfies this set of circumstances. The variance to the estimated value is $35,000.00 which is above $30,000.00. The loan amount of $200,000.00 makes a derived LTV ratio 0.89 which is above 0.85. The returned value of $225,000.00 is above $200,001.00. In this row, risk tier 4 calls for an AVI which is an interior inspection.

The following flow charts illustrate software implemented in the logic server 22 of FIGS. 1 and 2 for automating the loan origination process. Referring initially to FIGS. 3A–3D, a flow chart illustrates the program utilized when the underwriting query is initiated in a lender's work flow system. The flow diagram includes several horizontal bands. The top horizontal band illustrates the actions occurring in the lender's work flow system, the next lower horizontal band shows actions occurring in a gateway or communications routing system, such as the communication engine 36 of FIG. 2. The third horizontal band illustrates activities occurring in the logic engine 38. Lower bands shown in several of the figures are for activities occurring in automated valuation venders or an appraisal engine.

Figure 3A:
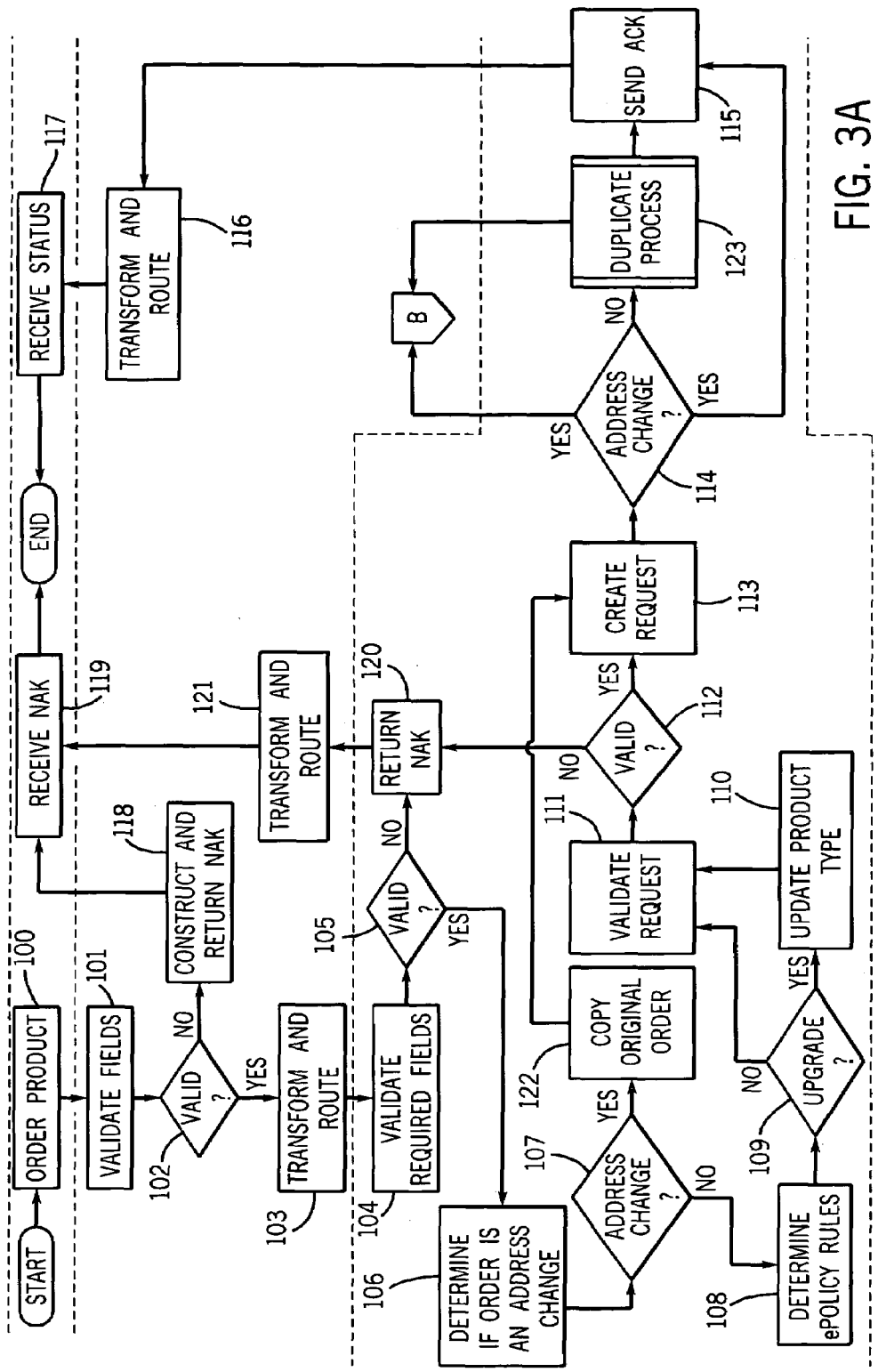
FIGS. 3A–3D comprise a flow diagram illustrating software for implementing the system and method of the invention utilizing a lenders work flow system.

The program begins at FIG. 3A at a block 100 where a customer submits an order for a valuation report. They can choose ePolicy rules determined, electronic or manual appraisal products. A block 101 validates the fields to determine if required fields are present and to perform some cross-field validation. A decision block 102 determines if the request has passed all gateway validations. If so, then at a block 103 the gateway receives the message in the lenders workflow system format from the workflow system and transforms it into the system providers workflow system format. It then routes the message to the providers workflow system.

A block 104 in the providers workflow system performs validation to determine if required fields are present. A decision block 105 determines if the request has passed all provider workflow system validations. If so, then the program proceeds to a block 106 which determines if the order is for an address change. An address change order has only a few fields that differentiate it from a new order.

A decision block 107 determines if the product ordered an address change. If not, then a block 108 determines the ePolicy rules. This comprises reading the appropriate table to determine if a manual product is needed. A decision block 109 then determines if the product should be upgraded to manual product. If so, then the product type is upgraded to manual at a block 110. Thereafter, or if not upgraded to manual, then a block 111 performs validation. A decision block then determines if a request passed all of the providers workflow system validation. If so, then an AVM placeholder is created, or a request is created containing the specific product ordered at a block 113. The status is changed to indicate the request is in process.

A decision block 114 then determines if this product ordered for an address change. If so, then the system points to a node B, which continues on FIG. 3B, and also continues to a block 115 to send an acknowledgment from the providers workflow system through the gateway to the lender's workflow system once a request has been created and has passed duplicate checking. The gateway receives the message in the providers workflow system tag format at a block 116 and transforms it into the lender's workflow system format and then routes the message to the lender's workflow system where it is received at a block 117. The routine then ends.

Returning to the decision block 102, if the request has not passed all gateway validations, then the request contains invalid data and the gateway constructs and sends a not acknowledge (NAK) message to the lender's workflow system at a block 118. The message is received by the lender at a block 119 and the routine then ends.

Similarly, if the request did not pass all the provider's workflow system validation at the block 105, then an NAK message is returned at a block 120 and transformed and routed through the gateway at a block 121 to the block 119.

Finally, if the order contains an address change, as determined at the block 107, then the original order is copied at a block 122 and the program proceeds to the block 113. If the product ordered is determined to be duplicate, at the decision block 114, a duplicate subprocess is initiated at a block 123 and control proceeds to the node B and to the block 115.

Figures 1, 3B:
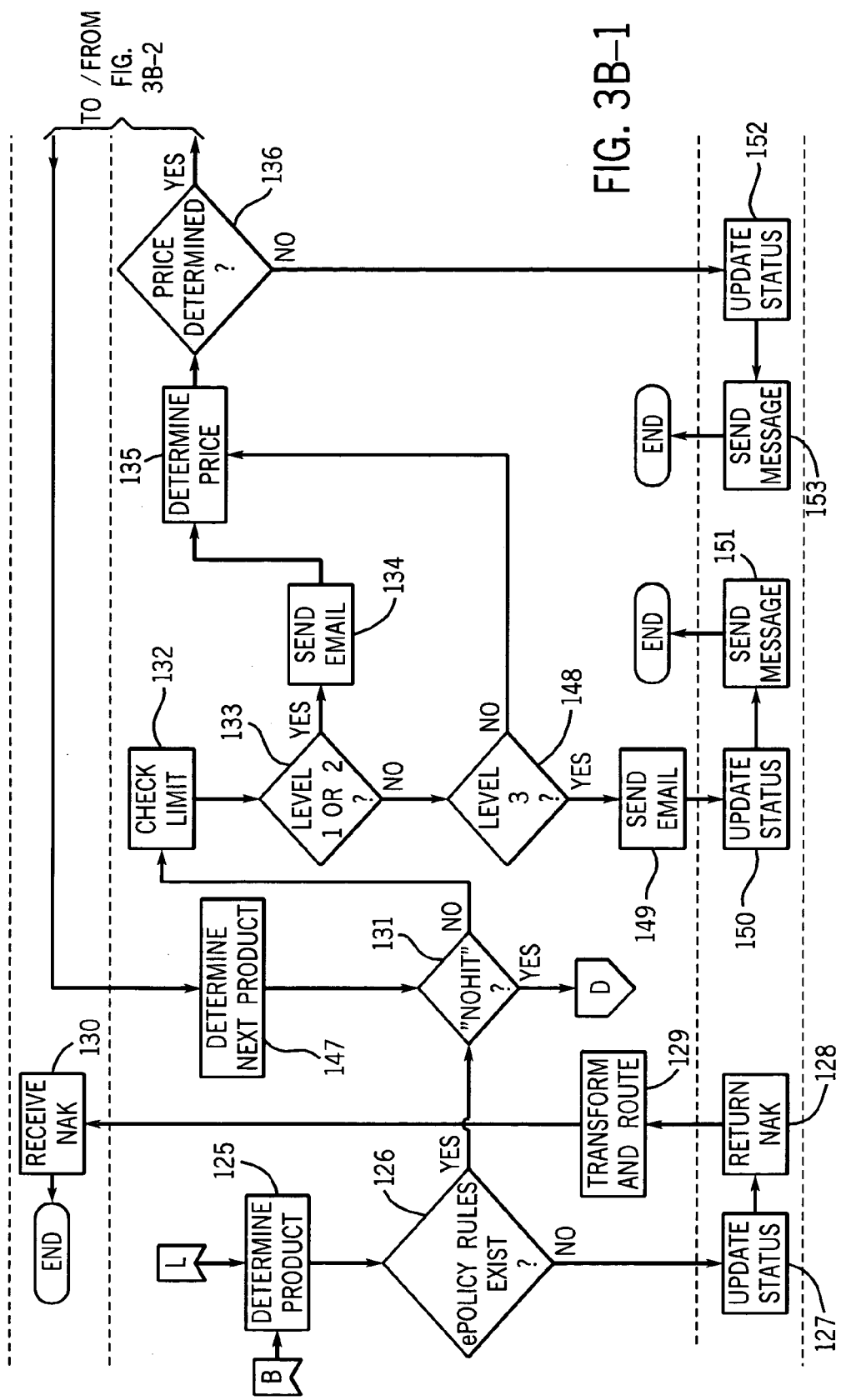
Figures 2, 3B:
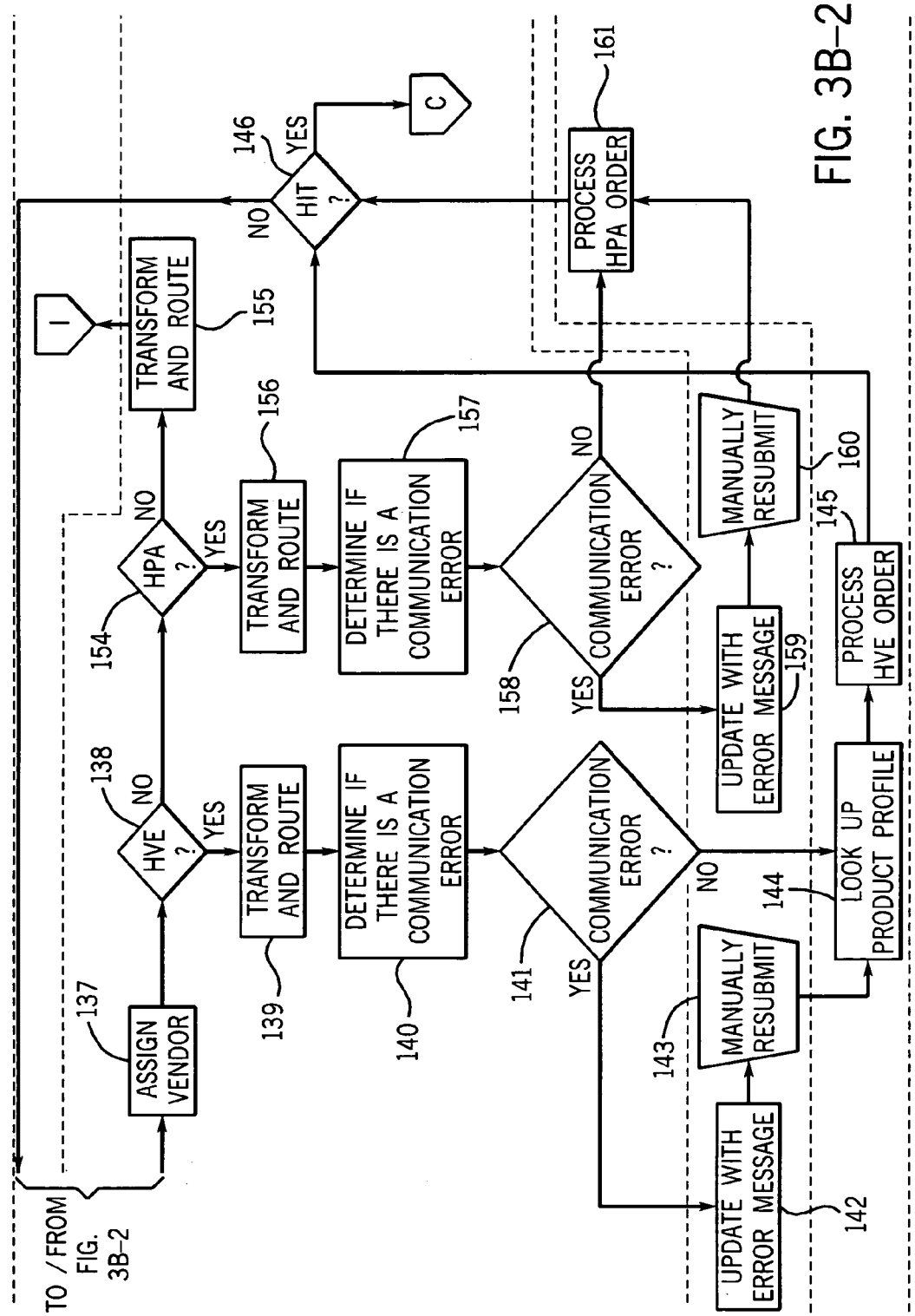

FIG. 3B illustrates the portion of the program for processing a new order. Pointing from either the node B, which originated on FIG. 3A, or a node L, which originates on FIG. 3D, discussed below, a block 125 determines a valuation product using the lenders ePolicy tables. A flow diagram for this block is described below relative to FIG. 4. A decision block 126 determines if ePolicy rules exist. If not, then the status in the providers workflow system is updated at a block 127 to indicate that the order cannot be processed. An NAK message is returned at a block 128 which is transformed and routed at a block 129 so that the lender's workflow system receives the NAK message at a block 130 and the routine ends.

If the ePolicy rules exist, as determined at the decision block 126, then a decision block 131 determines if a no hit product type was returned. If so, then the program points to a node D continued on FIG. 3D. If not, then the gateway checks the number of requests against a limit imposed by the customer to determine if the number is close to or exceeds a preselected limit at a block 132. There are three levels of alert for limits. Level 1 is for send email to sales. Level 2 is for send email to sales and accounting. Level 3 is to send email and cutoff the customer. A decision block 133 determines if it is a level 1 or 2 alert. If so, then the program sends an email at the block 134 and then determines a price for the product at a block 135. A decision block 136 determines if a price has been determined for the product. If so, then a vendor is assigned at a block 137. A block 138 determines if the chosen product is HVE. If so, then the data is transformed to HVE system format and routed at a block 139. A block 140 checks for a communication error when sending the request through to the HVE system. A decision block 141 determines if there is a communication error. If so, then the provider's workflow system is updated with the error message at a block 142 and the request is manually resubmitted at a block 143. From the block 143, or if there was no communication error, then the automated valuation vendor looks up the product data using the customer profile at a block 144. This determines the type of HVE product that should be processed. The HVE order is processed at a block 145. The order processing returns information to a decision block 146 which determines if it is a hit. If so, then the program points to a node C which continues on FIG. 3D. If not, then the program advances to a block 147. If at least one product has been processed, then the next product in the rules is determined at this block. The control then returns to the block 131 to continue processing.

If the check limit level is not 1 or 2, as determined at the decision block 133, then a decision block 148 determines if the limit check returned a level 3 warning. If not, then the program returns to the block 135, discussed above. If so, then an email is sent at a block 149, status is updated at a block 150 in the provider's workflow system to indicate that the order cannot be processed because the limit is reached. A message is sent to the gateway at a block 151 to inform it to terminate the process and the routine ends.

If there was no price determined for a product, at the decision block 136, then the status is changed at a block 152 to indicate that the order cannot be processed because the price could not be found on the provider's workflow system. A message is sent to the gateway at a block 153 to terminate the process which then ends.

If the product chosen is not HVE, as determined at the decision block 138, then a decision block 154 determines if the product type is HPA. If not, then the data is transformed and routed at a block 155 and points to a node I which continues on FIG. 3C. If an HPA product is chosen, then a block 156 transforms the data from the provider's workflow system format to HPA system format and routes it to the HPA vendor. A decision block 157 determines if there is a communication error when sending the request through to the HPA system. The decision block 158 evaluates the determination. If there is a communication error, then the provider's workflow system is updated with an error message at a block 159 and the product is manually resubmitted at a block 160. Thereafter, or if there has not been a communication error, then the HPA order is processed by the vendor at a block 161. After the order is processed, then control returns to the decision block 146 to determine if the order processing returned a completed product, as discussed above.

Figures 1, 3C:
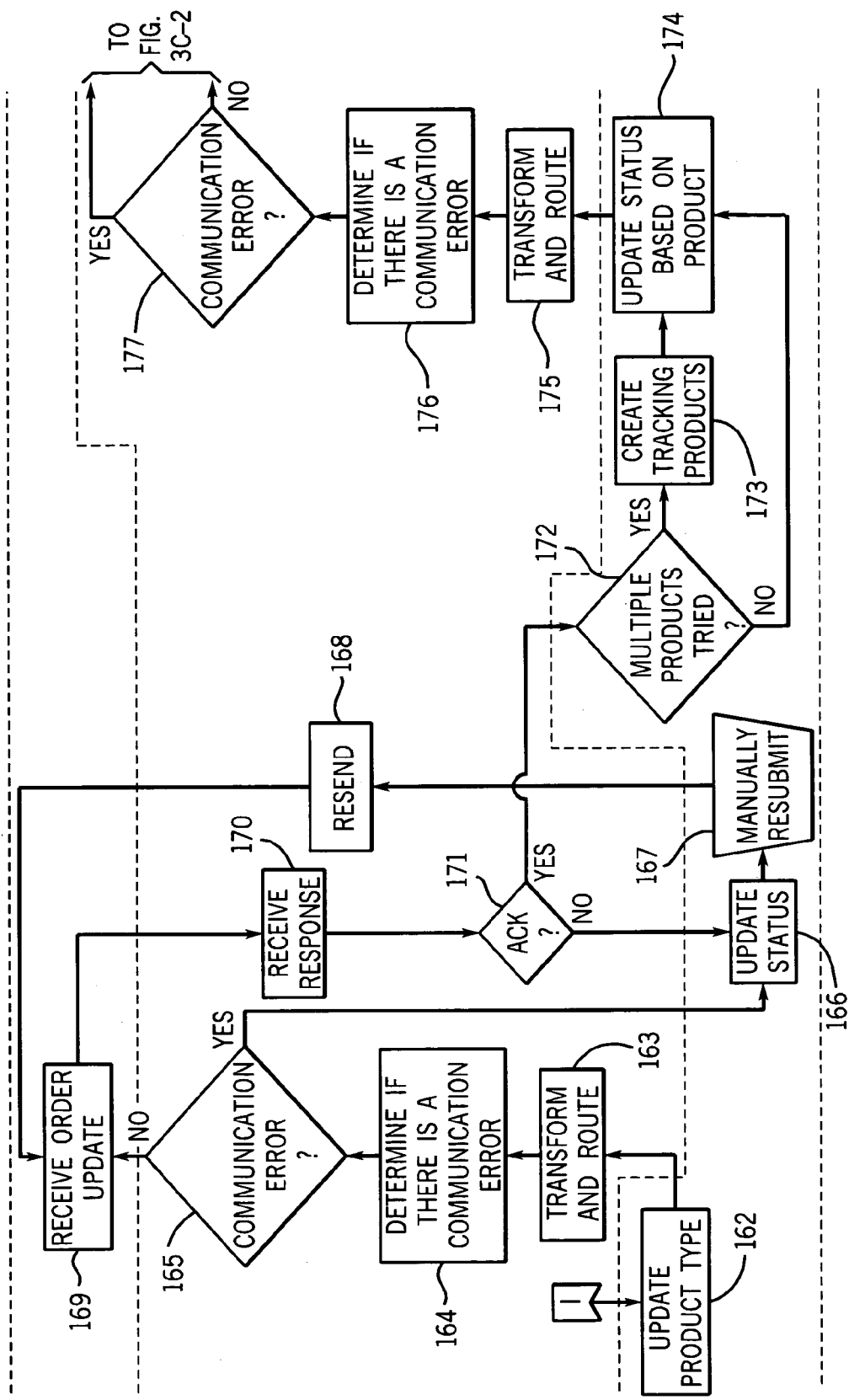
Figures 2, 3C:
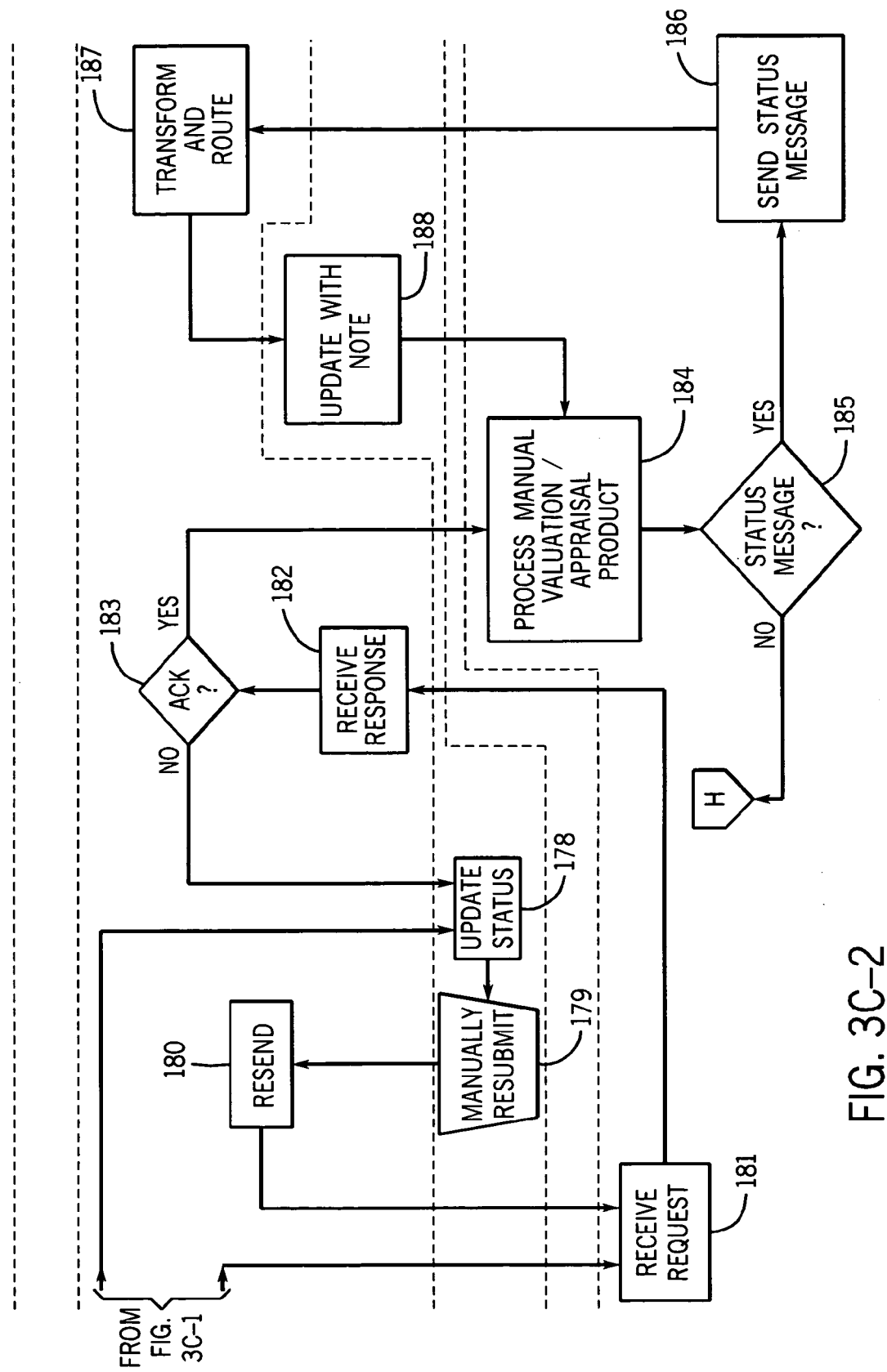

FIG. 3C illustrates a continuation of the program for processing the new order begun on FIG. 3B. From the node I, a block 162 updates the product type which is transformed and routed at a block 163. A block 164 determines if there has been a communication error. If there is a communication error, as evaluated at a decision block 165, then status is updated at a block 166 to reflect if a negative acknowledgment was received or to reflect a communication error. The product is manually resubmitted at a block 167. The gateway resends the message to the lender's workflow system at a block 168 after receiving a negative acknowledgment or communication error. The lender's workflow system receives the order update at a block 169. The order update is also received at the block 169 if there was no communication error, as determined at the decision block 165.

From the block 169, the gateway receives a response from the lender's workflow system, either an ACK or a NAK at a block 170. A decision block 171 determines if the response was ACK. If so, then the program proceeds to a block 172 which determines if multiple products were processed before a hit was received. If yes, then a block 173 creates tracking products. A tracking product is created for each no hit product and given a status of no hit. Tracking products are determined by fields AVM 1 and AVM 2. If these fields are populated, then the provider's workflow system creates tracking products as HVE and HPA respectively. The upgrade code equals no hit if the order was not upgraded to a manual appraisal product. From the block 173, or if there are not multiple products tried, then a block 174 updates status based on product. Once a positive acknowledgment is received from the lender's workflow system, the status is updated based on the product type. Status is changed to indicate that the process is completed. The request is then transformed and routed at a block 175. A block 176 checks for a communication error. A decision block 177 decides if there is a communication error or if the appraisal system did not receive the request. If so, then status is updated at a block 178 and the request is manually resubmitted at a block 179. The gateway resends the message to the appraisal system at a block 180 after receiving a negative acknowledgment or communication error. The appraisal system receives the request at a block 181. The gateway receives a response from the appraisal system, either an ACK or a NAK at a block 182. A decision block 183 determines if the response is an ACK. If not, then the status is updated at the block 178. If so, then a block 184 processes the manual valuation/appraisal product. A decision block 185 determines if a status message needs to be sent to the provider's workflow system for status updates. If not, then the program points to a node H, see FIG. 3D. If so, then a status message is sent at a block 186 and is transformed and routed at a block 187. A block 188 updates the provider's workflow system with the note from the appraisal system that includes a status update, and then returns to the block 184.

Figures 1, 3D:
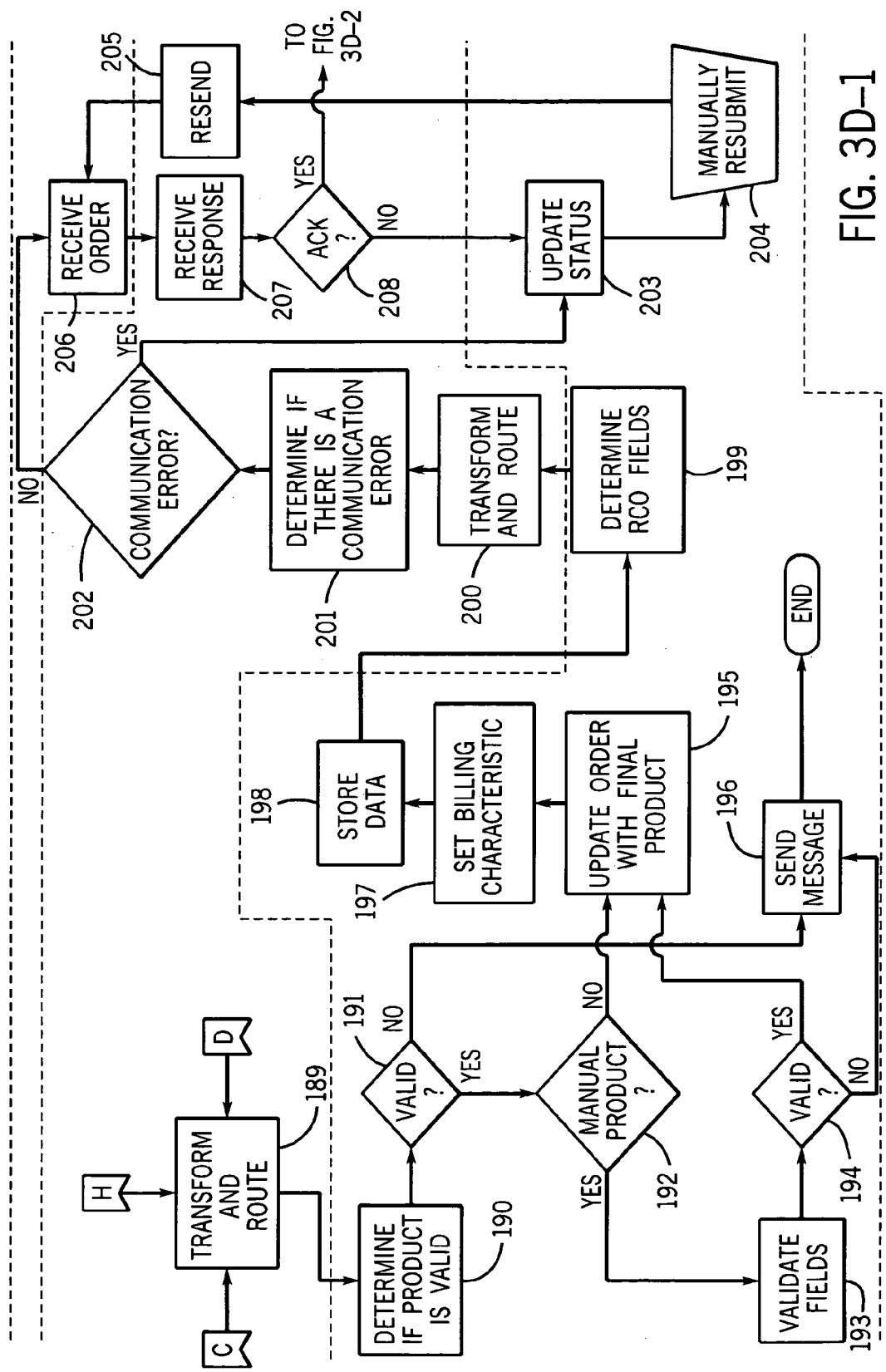
Figures 2, 3D:
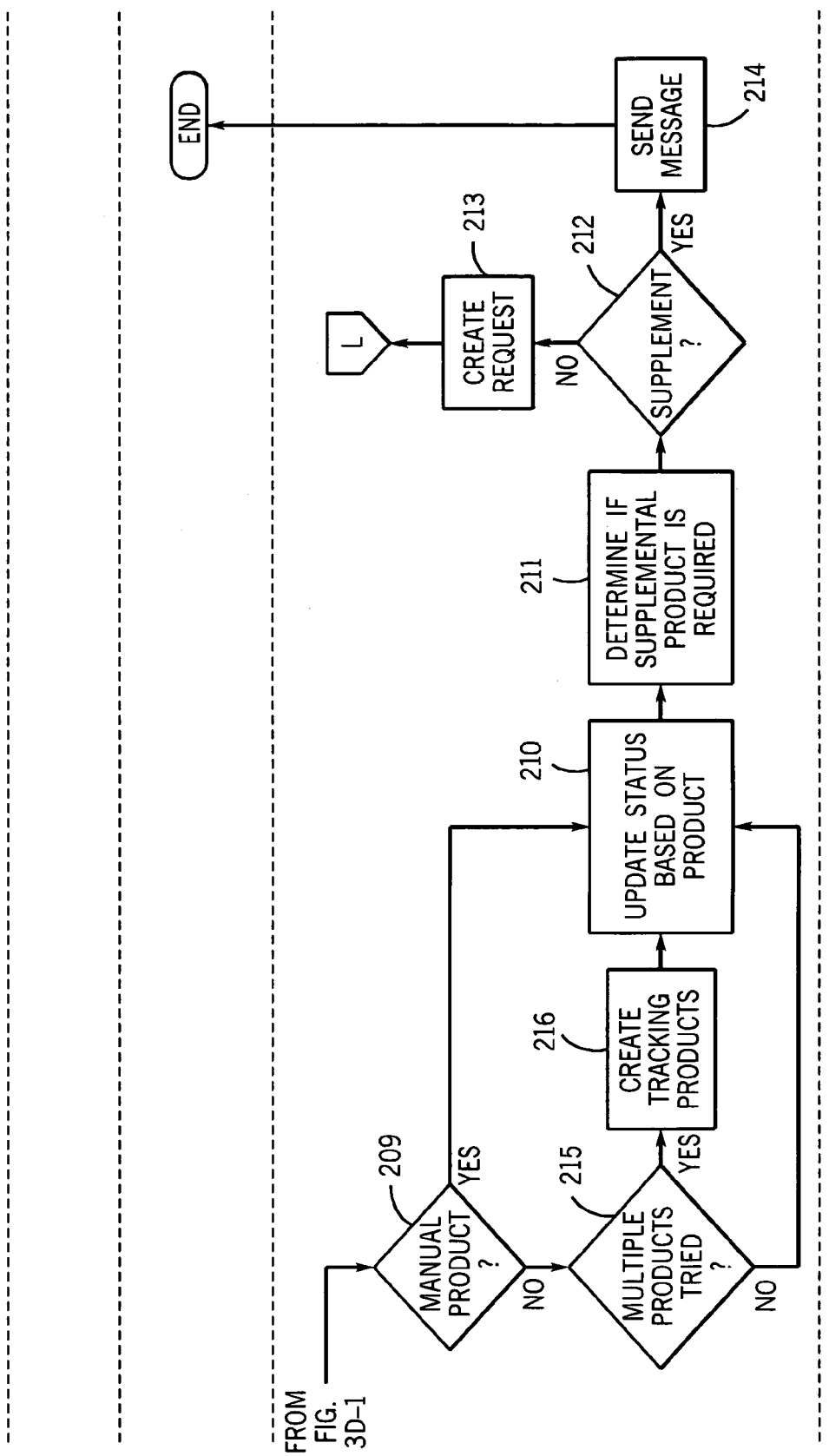

FIG. 3D illustrates a flow diagram for the portion of the program relating to fulfilling a new order. From any of nodes C, which represents a hit, node D which represents no hit, and node H which represents manual appraisal, data is transformed and routed at a block 189. The provider's workflow system determines whether the product returned is valid at a block 190. If the product is valid, then a decision block 191 proceeds to a decision block 192 which determines if the product is a manual product. If so, then the fields are validated at a block 193. A decision block 194 determines if a valid product is returned. If so, then a block 195 replaces the product type in the order with the final product. The block 195 is also utilized if the product was not a manual product, as determined at the decision block 192. If the product was not valid, as determined at the decision block 194, then a message is sent to the gateway at a block 196 to terminate the process which then ends.

After the order is updated with the final product at the block 195, then billing characteristics are set at a block 197. All lenders workflow system requests are classified as original or reorder for billing purposes. A block 198 receives and stores the product data. A block 199 determines the fields needed to be sent to the lender's workflow system. The data is transformed from the provider's workflow system format to the lender's workflow system format and routed at a block 200. A block 201 determines if there is a communication error. A decision block 202 then evaluates the communication error. If there is a communication error, then the status is updated at a block 203 and the product is manually resubmitted at a block 204. The gateway resends the message to the lender's workflow system at a block 205. The lender's workflow system receives the completed product at a block 206. Similarly, the lender's workflow system receives the order at the block 206 if there is no communication error, as determined at the decision block 202.

After the completed product is received, the gateway receives a response, either an ACK or a NAK at a block 207. A decision block 208 determines if the response is an ACK. If not, then control returns to the block 203, discussed above. If so, then a decision block 209 determines if the product is a manual type. If so, then a block 210 updates the status based on the product type. Status is changed to indicate that the process is completed. A block 211 determines if a supplemental product is required. If a supplemental product is required, then a decision block 212 proceeds to a block 213 to create a request for the supplemental product and the program then points to a node L, see FIG. 3B, above. If no supplemental product is required, then the program proceeds to a block 214 which sends a message to the gateway to inform it to terminate the process which then ends.

If the product is not a manual product, as determined at the decision block 209, then a decision block 215 determines if multiple products were processed before a hit was received. If not, then status is updated at the block 210. If so, then tracking products are created at a block 216 and the status is then updated at the block 210.

Figures 1, 4:
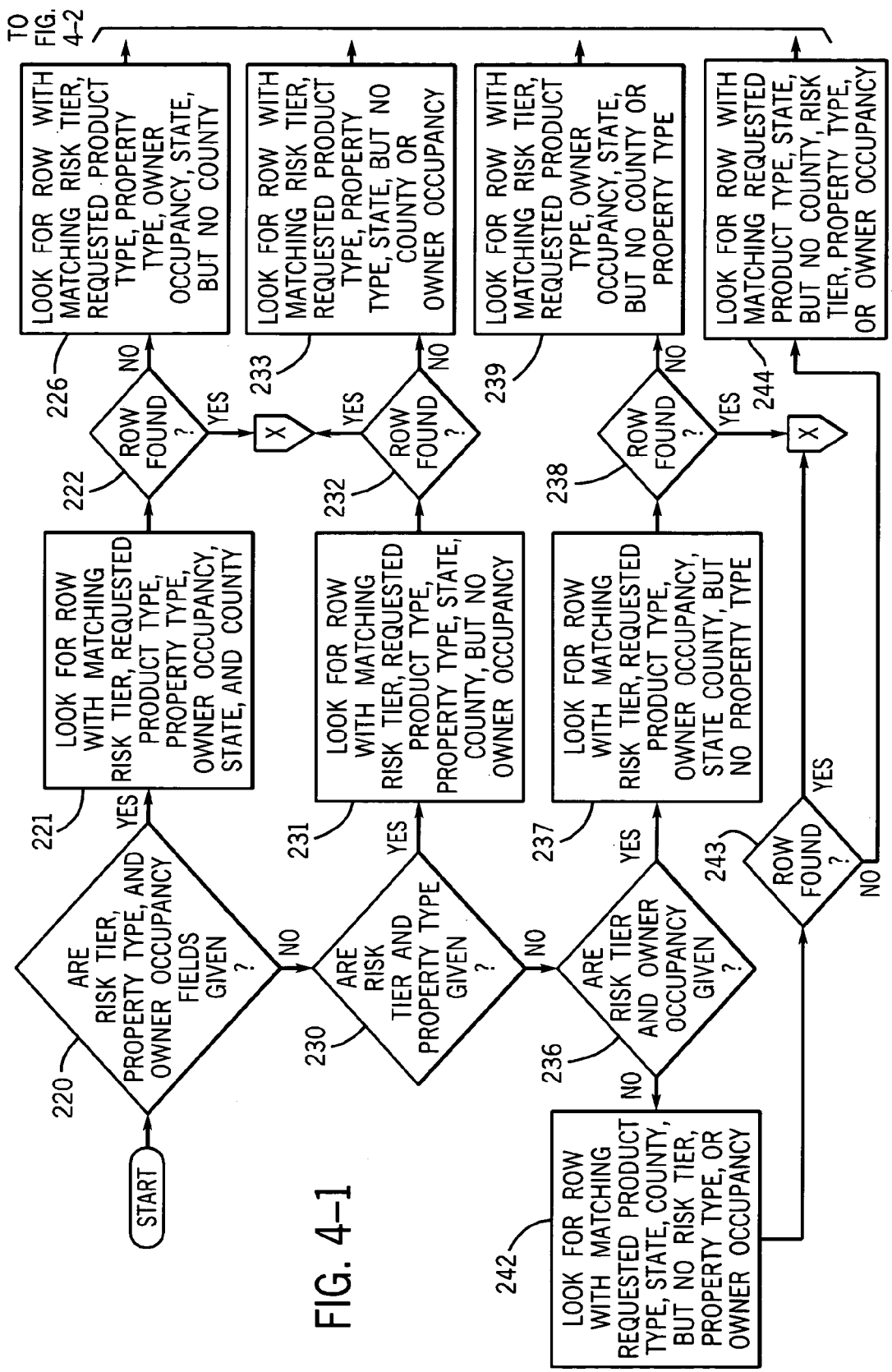
FIG. 4 is a flow diagram illustrating a routine for determining a product selection initiated in the lenders work flow system of FIG. 3B.
Figures 2, 4:
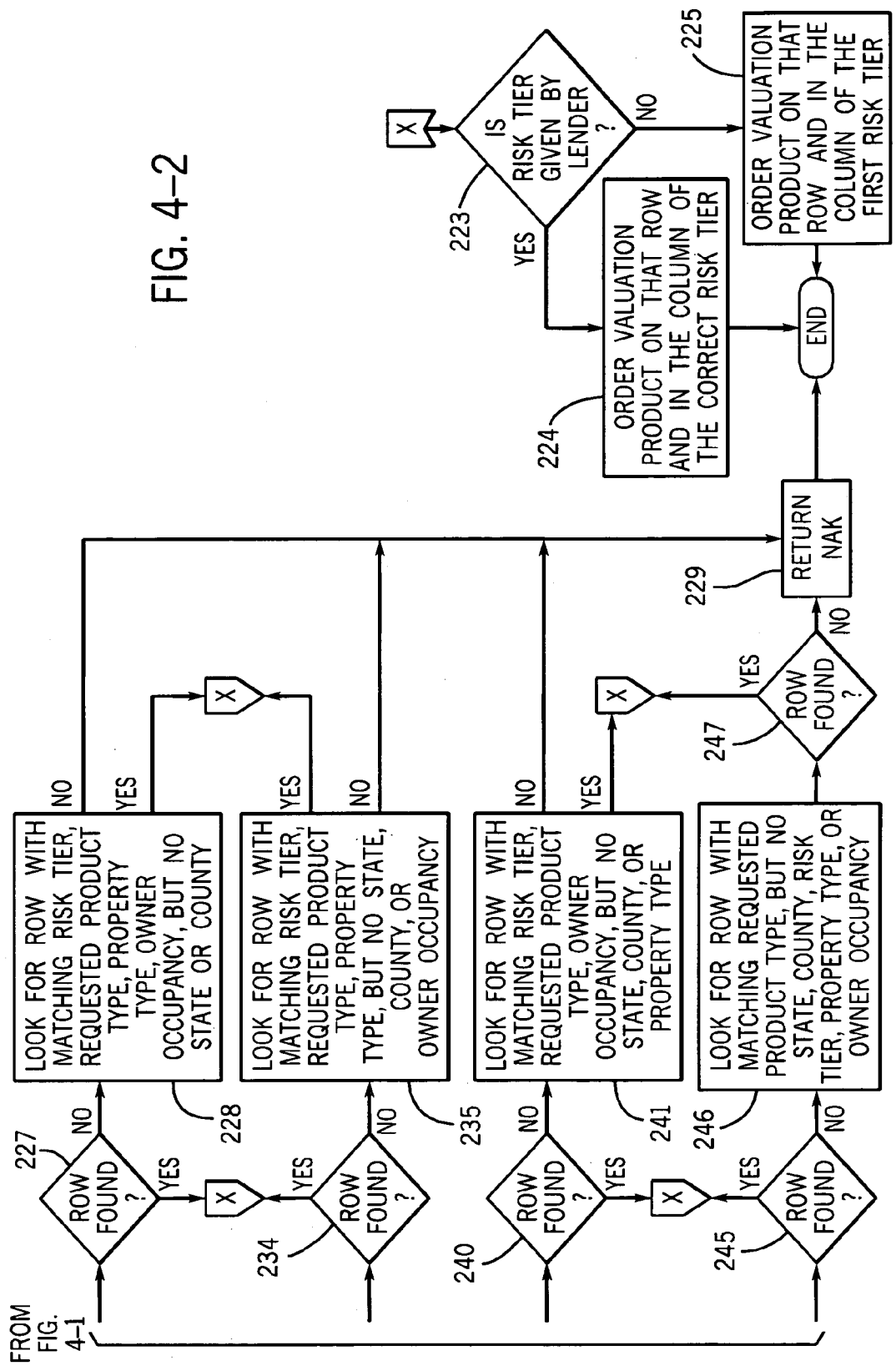

Referring to FIG. 4, a flow diagram illustrates the determine product routine called at the block 125 of FIG. 3B. This routine is used to select the product type to be ordered from ePolicy tables, discussed above.

The determine product routine begins at a decision block 220 which determines if the risk tier, property type and owner occupancy fields are given. If so, then a block 221 looks for the row with matching risk tier, requested product type, property type, owner occupancy, state and county. A decision block 222 determines if a row is found. If so, then the program proceeds via a node X to a decision block 223 which determines if a risk tier is given by the lender. If so, then a block 224 orders the valuation product on that row and in the column of the correct risk tier and the routine ends. If not, then the program orders the valuation product on that row and in the column of the first risk tier at a block 225 and the routine ends.

If a row was not found at the decision block 222, then a block 226 looks for a row with matching risk tier, requested product type, property type, owner occupancy, state, but no county. A decision block 227 determines if a row was found. If so, then control advances to the node X. If not, then a block 228 looks for a row with matching risk tier, requested product type, property type, owner occupancy, but no state or county. If a row is found, then control advances to the node X. If not, then a NAK is returned at a block 229 and the routine ends.

If the risk tier, property type, and owner occupancy fields are not given at the decision block 220, then a decision block 230 determines if risk tier and property type are given. If so, then a block 231 looks for a row with the matching risk tier, requested product type, property type, state, county but no owner occupancy. A decision block 232 determines if a row was found. If so, then the program points to the node X. If not, then a block 233 looks for a row with matching risk tier, requested product type, property type, state, but no county or owner occupancy. A decision block 234 determines if a row was found. If so, the program points to the node X. If not, a block 235 looks for a row with matching risk tier, requested product type, property type, but no state, county or owner occupancy. If a row was found, then the program points to the node X. If not, then a NAK is returned at a block 229.

If risk tier and property type are not given, as determined at the decision block 230, then a decision block 236 determines if risk tier and owner occupancy are given. If so, then a block 237 looks for a row with matching risk tier, requested product type, owner occupancy, state, county, but no property type. A decision block 238 determines if a row was found. If so, the program points to the node X. If not, a block 239 looks for a row with matching risk tier, requested product type, owner occupancy, state, but no county or property type. A decision block 240 determines if a row is found. If so, the program points to the node X. If not, a block 241 looks for a row with a matching risk tier, requested product type, owner occupancy, but no state, county or property type. If a row is found, then the program points to the node X. Otherwise, a NAK is returned at the block 229.

If risk tier and owner occupancy are not given, as determined at the decision block 236, then a block 242 looks for a row with matching requested product type, state, county, but no risk tier, property type or owner occupancy. A decision block 243 determines if the row was found. If so, then the program points to the node X. If not, a block 244 looks for a row with matching requested product type, state, but no county, risk tier, property type or owner occupancy. A decision block 245 determines if a row is found. If so, the program points to the node X. If not, a block 246 looks for a row with matching requested product type, but no state, county, risk tier, property type or owner occupancy. A decision block 247 determines if a row was found. If so, the program points to the node X. If not, a NAK is returned at the block 229 and the routine ends.

As is apparent, the specific routine for determining products could differ depending on the types of criteria provided in the policy tables. For example, in addition to criteria for risk tier, requested type, property type, owner occupancy, state and county, other criteria can include estimated property value, loan amount, loan to value amount, as noted with Table 2 above. This would simply require the addition of additional rows or columns in the flow diagram of FIG. 4 for evaluating such criteria in the table.

Figures 1, 5:
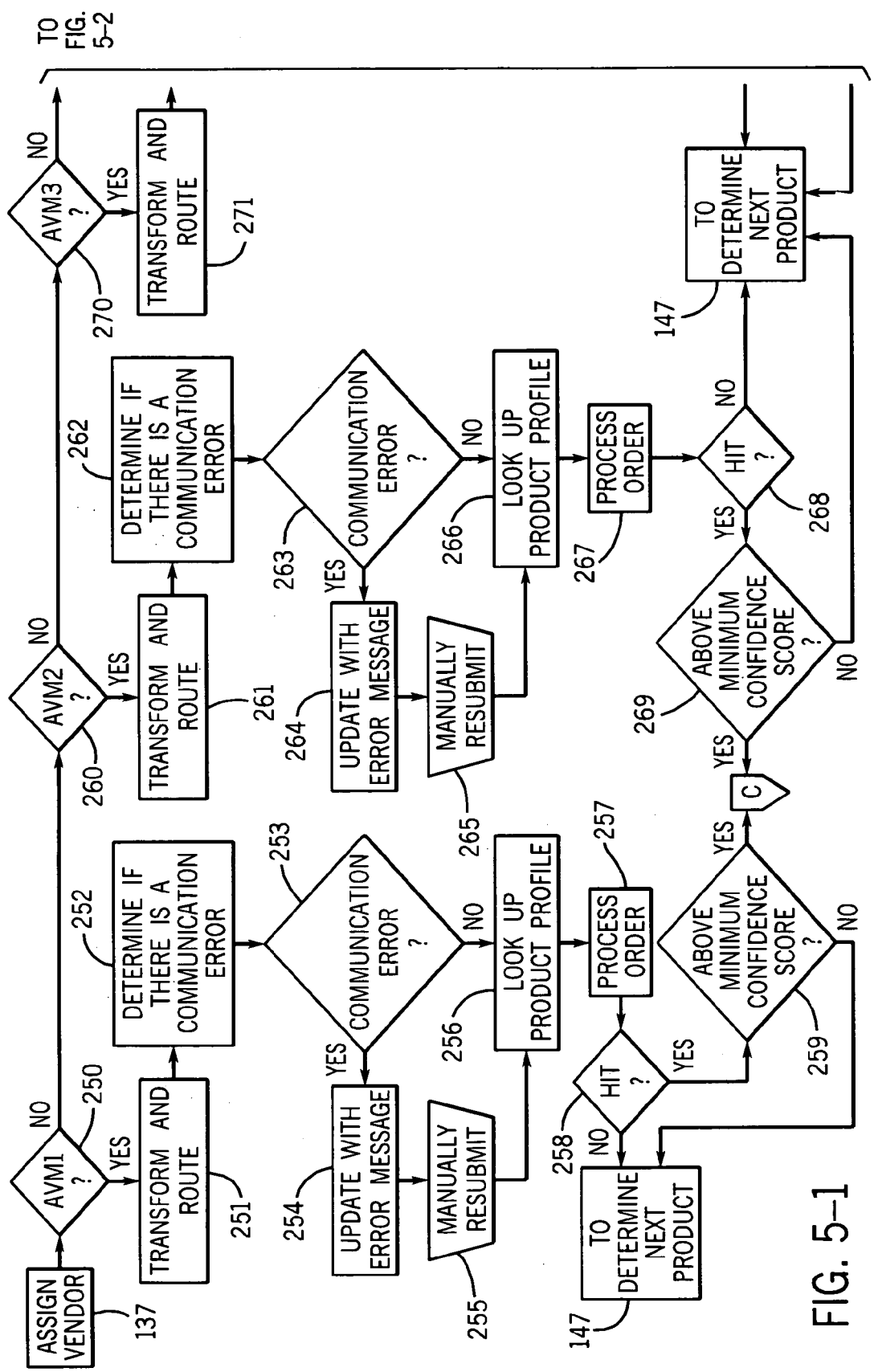
FIG. 5 is a flow diagram of a software routine for alternative feature of the flow diagram of FIG. 3B for utilizing confidence scores.
Figures 2, 5:
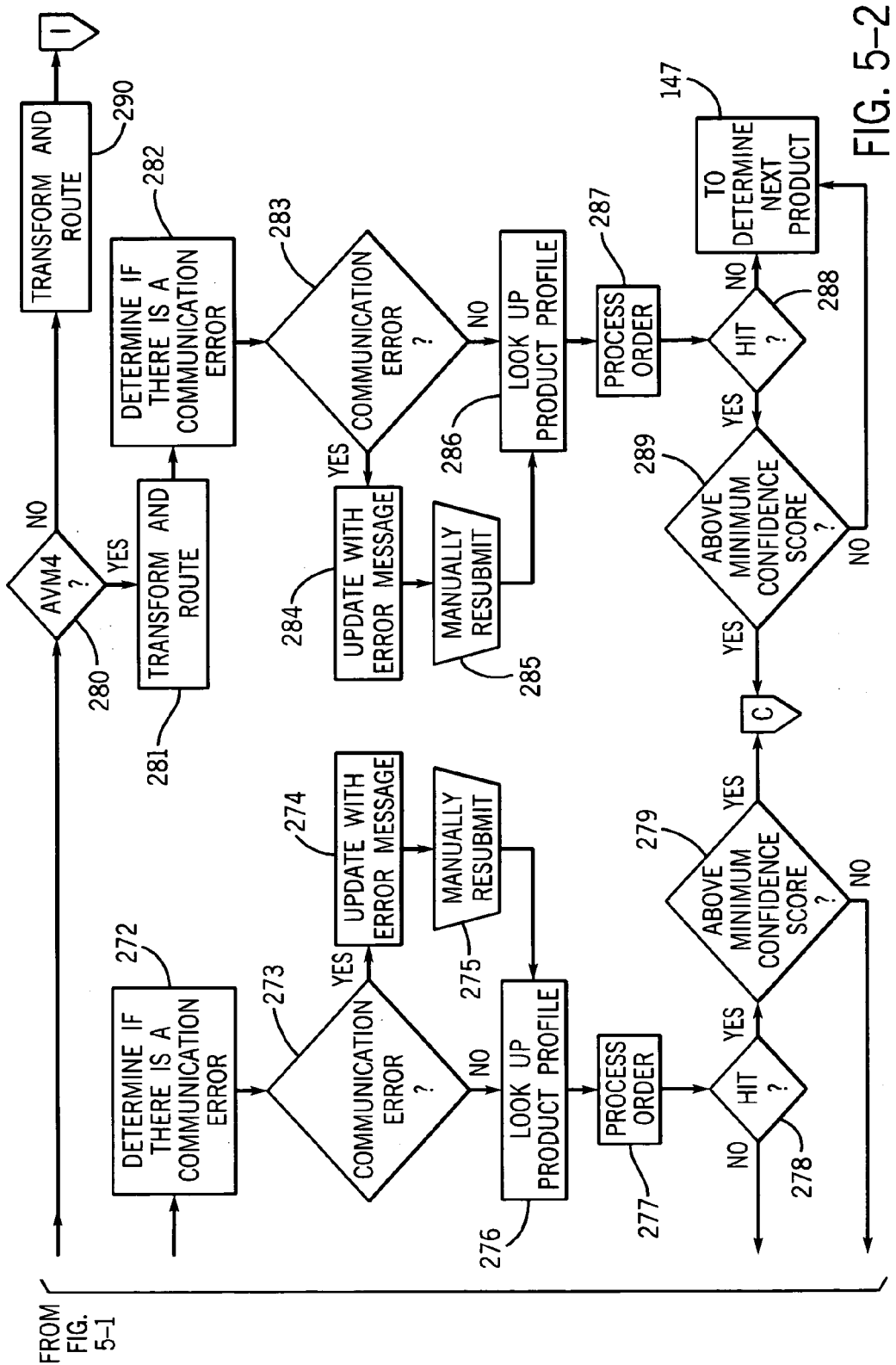

FIG. 5 illustrates a flow diagram for an alternative routine for processing a new order shown on FIG. 3B. Particularly, the flow chart of FIG. 5 replaces the flow diagram elements generally between blocks 137 continuing to block 147 on FIG. 3B. These blocks 137 and 147 are included in the flow diagram of FIG. 5.

The routine illustrated in FIG. 5 illustrates the use of cascading AVMs with confidence scores, as described above relative to Table 3. The AVMs are described in this flow chart generically as AVM1, AVM2, AVM3 and AVM4. As is apparent, any type of AVM or other product could be used in this method.

The program begins this routine at the block 137. A decision block 250 then determines if the product chosen is AVM1. If so, then the data is transformed from the provider's workflow system to the AVM1 system format at a block 251 and routed. A block 252 determines if there is an error in communication. If there is an error in communication, then a decision block 253 continues to a block 254 which updates the provider's workflow system with an error message based on the communication error with the AVM1 system. The product is manually resubmitted from the provider's workflow system at a block 255. Thereafter, or if there was no communication error, then the product data is looked up using the customer profile at a block 256. The order is processed by the AVM1 provider at a block 257. A decision block 258 determines if there is a hit. If not, then the program proceeds to the block 147 to determine the next product. If there is a hit, then a decision block 259 determines if the returned confidence score is above the lender's selected minimum confidence score. If not, then this is similar to a no hit and the program advances to the block 147 to determine the next product. If the confidence score is above the minimum, then the criteria is satisfied and the program points to the node C, discussed above relative to FIG. 3B.

Returning to the decision block 250, if the product selected is not AVM1, then a decision block 260 determines if the product is AVM2. If so, then the program implements a routine at blocks 261–269 which are functionally identical relative to respected blocks 251–259. If AVM2 is not selected, then a decision block 270 determines if AVM3 is selected. If so, then a routine utilizing blocks 271–279 is implemented. Again, the blocks 271–279 are functionally identical to the respective blocks 251–259. If AVM3 is not selected, then a decision block 280 determines if AVM4 is selected. If so, then the programs proceeds to a routine consisting of blocks 281–289. The blocks 281–289 are functionally identical to the blocks 251–259, discussed above. For simplicity, the blocks 261–269, 271–279 and 281–289 are not specifically described herein. However, as will be apparent, the implementation of the particular blocks may differ relative to one another due to difference in communication and format of data and the like with respect to the different product vendors. If AVM4 is not selected, then a block 290 transforms and routes the data via the node I to the block 162 of FIG. 3C, discussed above.

FIGS. 6A–6D illustrate an alternative use of the loan underwriting system 20 wherein the lender uses a web browser interface. In this embodiment, the top most horizontal band represents the information received at the web site server 32, see FIG. 1. In generally, the methods are similar to those discussed above relative to FIGS. 3A and 3D and thus some of the functional steps will be more generally described below.

Figure 6A:
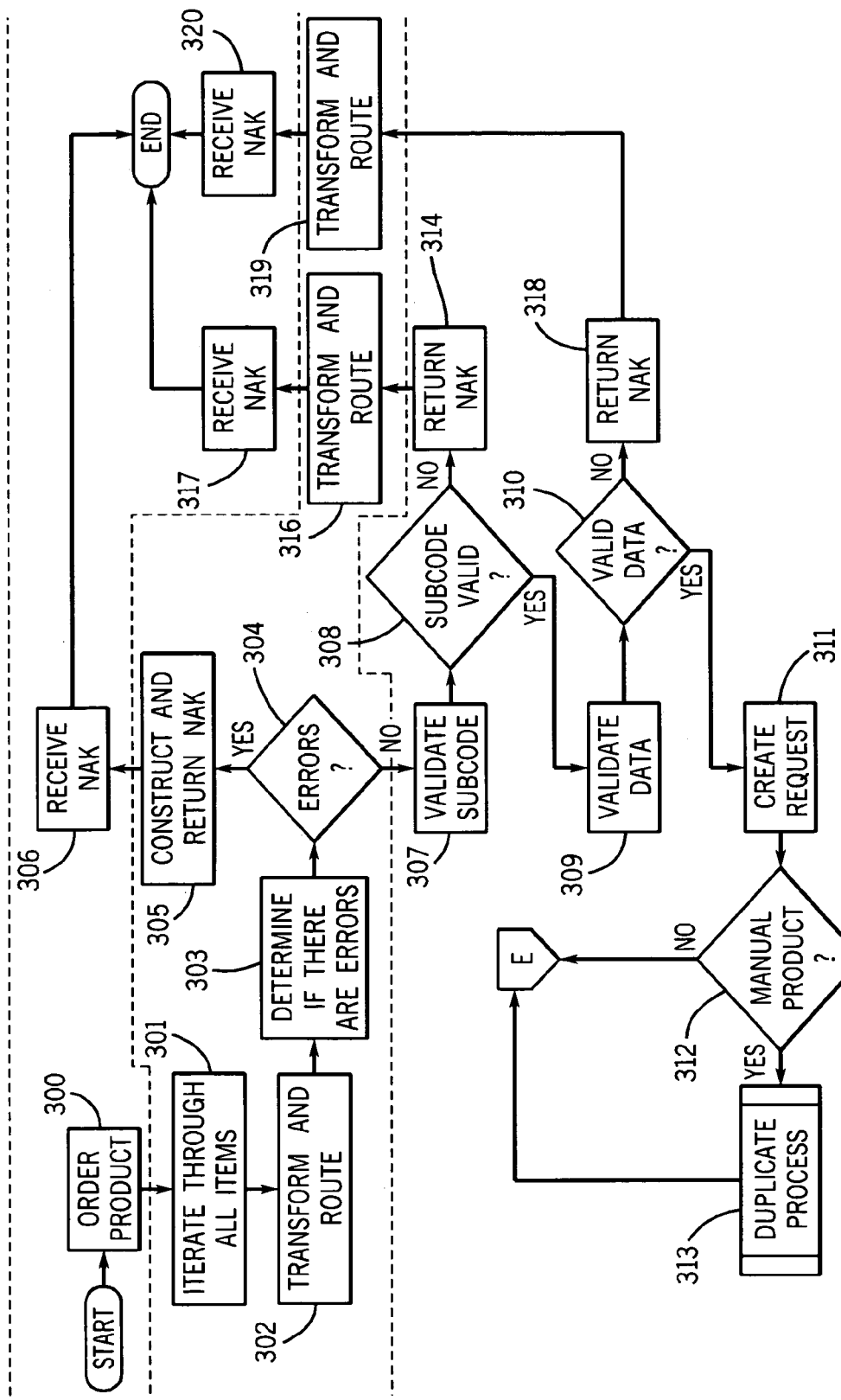
FIGS. 6A–6D comprise a flow diagram illustrating software for implementing the system and method of the invention utilizing a web site interface.

FIG. 6A illustrates a flow chart for submitting a new order via the provider's web site. The program begins at a block 300 where a customer submits an order for a valuation report. The customer can choose ePolicy rules determined, electronic, or manual appraised product. A block 301 iterates through all items in the order and decomposes it. Each item within the order is sent to the provider's workflow system separately. A block 302 transforms the information from XML format to the provider's work flow system and then routes the message to the provider's workflow system. Blocks 303 and 304 determine if there are any errors. If so, then a block 305 constructs a NAK message and sends it to a web site which receives the message at a block 306. The routine then ends. If there is no error, then the subcode on the request is verified to be sure it is a valid subcode in the system at a block 307. A decision block 308 determines if it is a valid subcode. If so, then a block 309 validates the data. A decision block 310 determines if the data is valid. If so, then a block 311 creates a request. A unique ID value is created for the request. A decision block 312 determines if the request is for a manual product. If so, then a duplicate check is performed at a block 313. If not, or after the duplicate check is performed, then the program points to a node E which continues on FIG. 6B.

If the subcode was not valid, as determined at the decision block 308, then a block 314 returns a NAK message which is transformed and routed at a block 316 and received at a block 317. The routine then ends. Similarly, if the data was not valid, as determined at the block 310, then an NAK message is returned at a block 318 which is transformed and routed to a block 319 and received at a block 320. Again, the routine then ends.

Figure 6B:
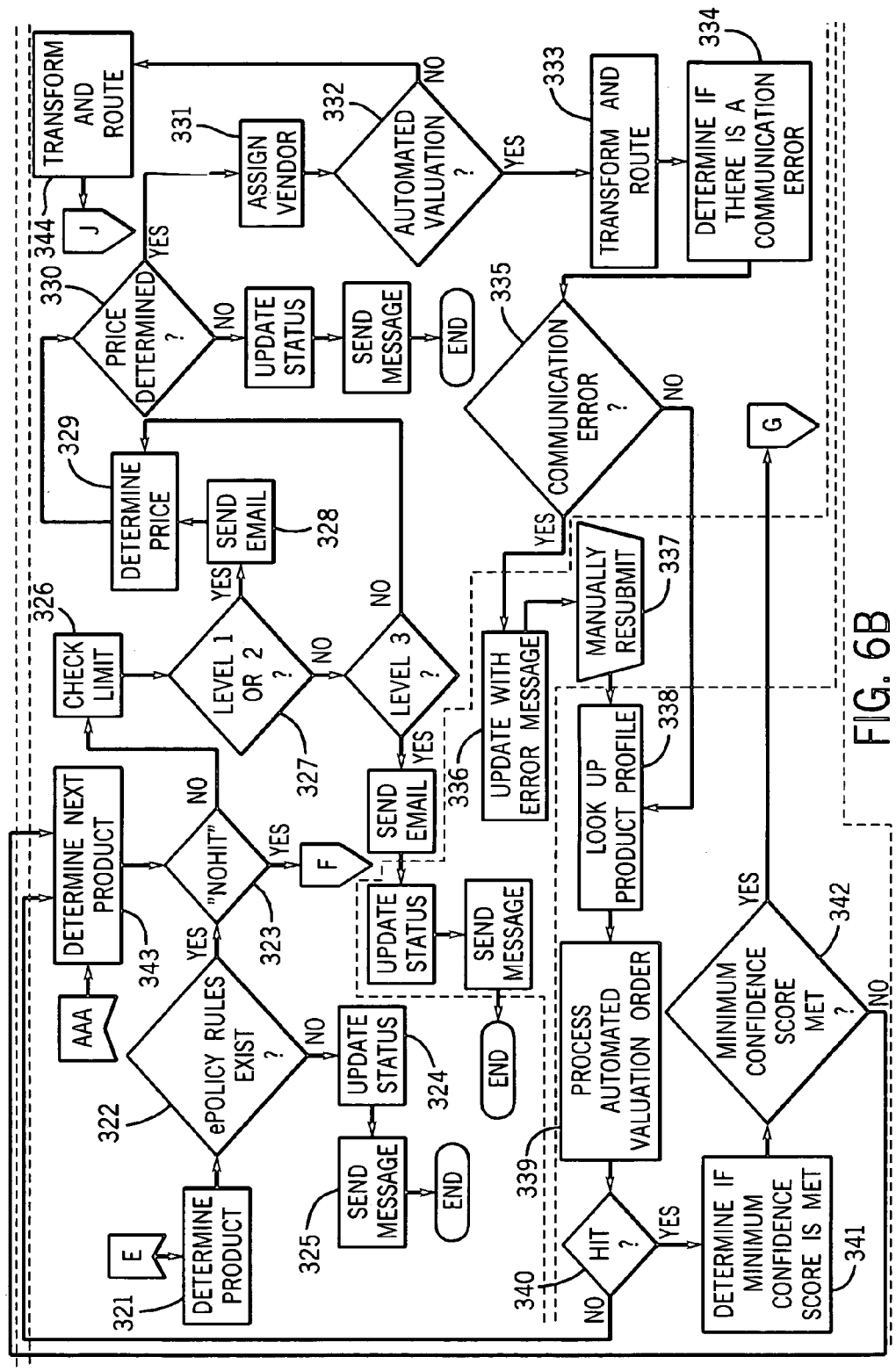

Referring to FIG. 6B, a flow diagram illustrates the method for processing a new order entered via the provider's website. This program begins at a block 321 which determines the product type using the customer's ePolicy tables. Particularly, the product is determined using the routine described above relative to FIG. 4. The decision block 322 determines if ePolicy rules exist. If so, a block 323 determines if a no hit was returned from the ePolicy tables. If so, then the routine points to a node F which continues on FIG. 6D. If ePolicy rules do not exist, then the status in the provider's workflow system is updated at a block 324 to indicate that the order cannot be processed. A message is sent at a block 325 and the program ends.

If the ePolicy rules did not provide a no hit, as determined at the decision block 323, then a block 326 checks the number of requests against the limit imposed by the customer to determine if the number is close to or exceeds the limit, as discussed above. A decision block 327 determines if the limit check returned a level 1 or 2 warning. If so, then an email is sent at a block 328. A price is applied to the product at a block 329. A decision block 330 determines if a price was found for the product. If so, then a block 331 assigns a vendor for the manual product. A decision block 332 determines if the products chosen is an automated valuation. If so, then the data is transformed from the provider's workflow system at a block 333 and routed to the AVM vender's system format and routed. Blocks 334 and 335 determine if there is a communication error. If so, then the provider's workflow system is updated with an error message based on the communication error at a block 336. The product is manually resubmitted at a block 337. Thereafter, or if there was no communication error, then a block 338 looks up products data using the customer profile. This determines the type of product that should be processed. The automated valuation order is processed at a block 339. A decision block 340 determines if the order processing returned a complete product. If so, then a block 341 determines if a minimum confidence score is met. If so, then the program points to a node G, which continues on FIG. 6D. If there was no hit, as determined at the decision block 340, or the minimum confidence score is not met, as determined at the decision block 342, then the program proceeds to a block 343 which determines the next process in the ePolicy table. The control then proceeds to the block 323, discussed above. Returning to the decision block 332, if the product chosen was not an automated valuation, then the message is transformed and routed at a block 344 which points to a node J. The node J continues on FIG. 6C.

Figure 6C:
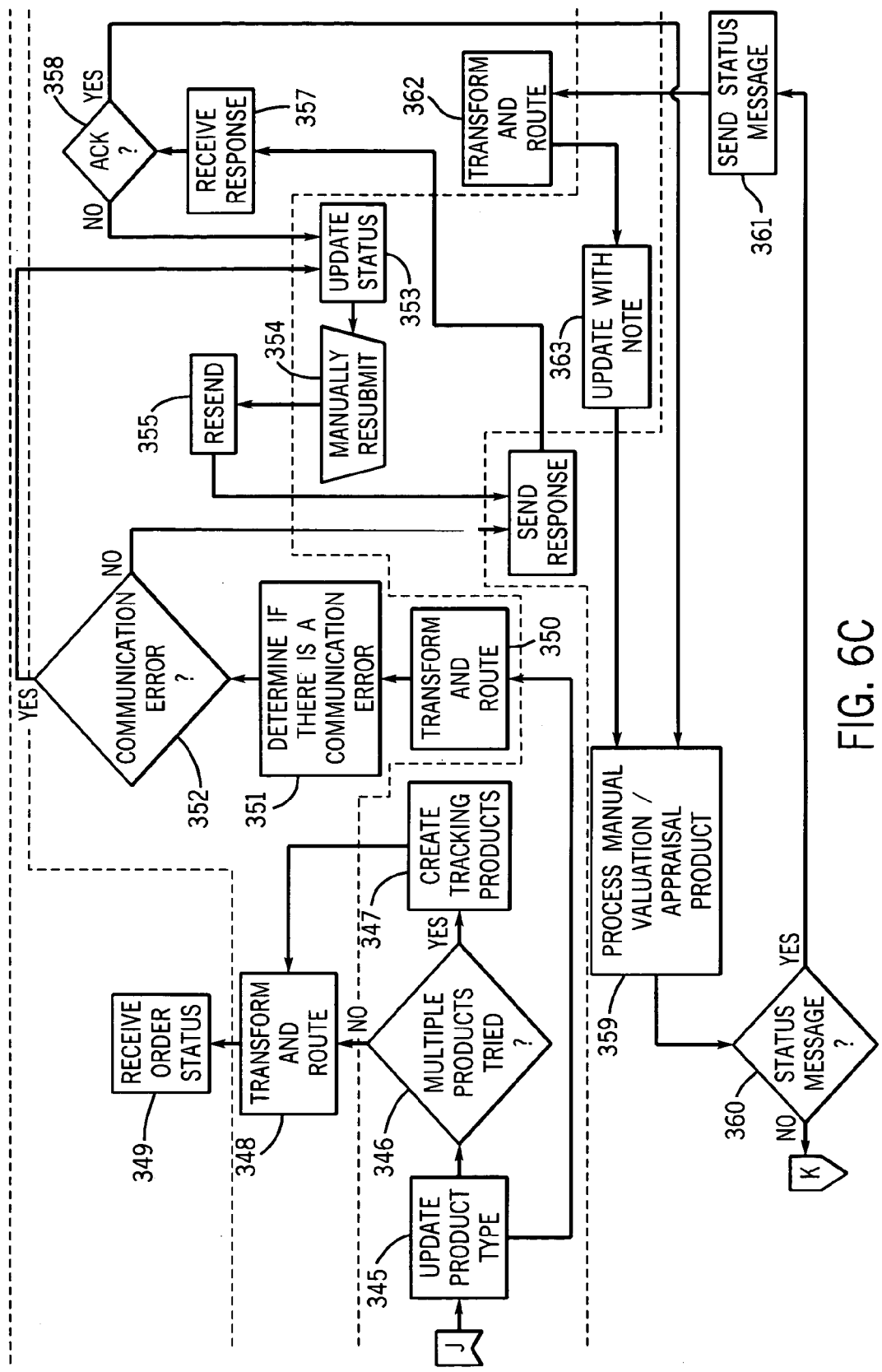

Referring to FIG. 6C, the flow diagram illustrates a program for returning order status for a new order entered via the provider's website. The node J points to a block 345 where an order is updated from a temporary placeholder name with the final product. A decision block 346 determines if multiple products were processed before a hit was received. If so, then a block 347 creates tracking products, as discussed above. Thereafter, or if manual products were not tried, then the data is transformed from the provider's workflow system to XML format and routed at a block 348. The order status is received at a block 349 at the website server 32, see FIG. 1.

After the product type is updated at the block 345, the program also proceeds to a block 350 which transforms the order from the provider's workflow system format into a provider's appraisal workflow system tag. Blocks 351 and 352 determine if there is a communication error. If so, then the status is updated to reflect the communication error at a block 353. The product is manually resubmitted at a block 354. The gateway resends the message to the appraisal system at a block 355. The appraisal system sends a response to the gateway at a block 356. The response is received at a block 357. A decision block 358 determines if an ACK was sent back from the appraisal system. If not, then status is updated at the block 353 to reflect negative acknowledgment. Otherwise, the program proceeds to a block 359 where the manual valuation/appraisal product is processed. A decision block 360 determines if notes need to be sent to the provider's workflow system for status updates. If so, then a status message is sent at a block 361. The message is transformed and routed at a block 362. The provider's workflow system is, updated with the note from the appraisal system at a block 363. The program then returns to the block 359. Finally, if there was no communication error at the block 352, discussed above, the program proceeds to the block 356, also discussed above, to send a response.

Figure 6D:
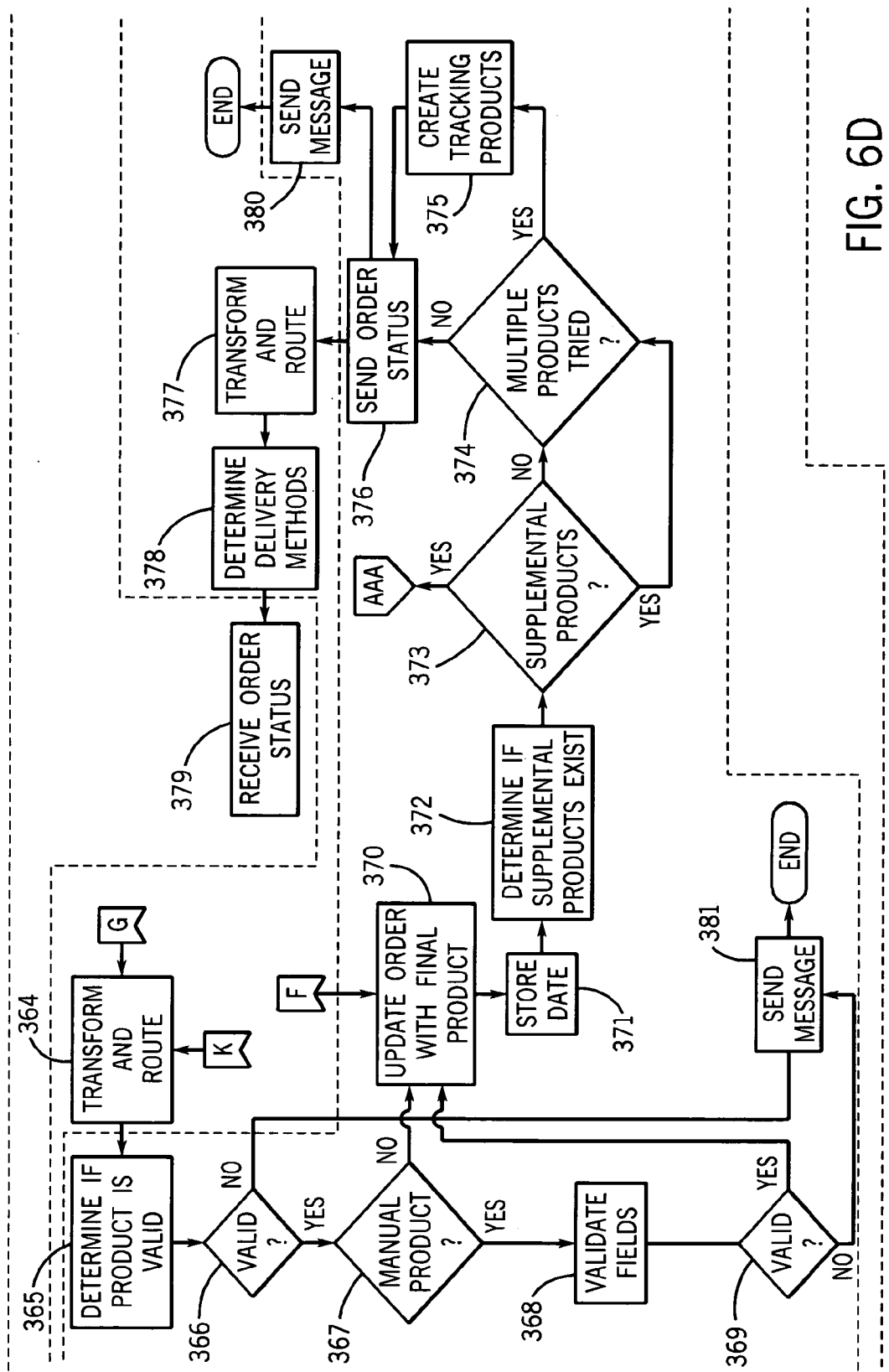

Referring to FIG. 6D, a flow diagram illustrates the program for returning order status for a new order. Pointing from either nodes G or K, a block 364 transforms data to the provider's workflow system format and routes it. Blocks 365 and 366 determine if the product returned from the gateway is valid. If so, then a decision block 367 determines if the product is a manual product. If so, then fields are validated at a block 368. A decision block 369 determines if the valid product was returned. If so, then the original order is updated with the product type of the returned product at a block 370. Similarly, if the product was not a manual product, as determined at the decision block 367, then the program also proceeds to the block 370. The block 370 can also be accessed when the program points to the node F, discussed above relative to FIG. 6B.

From the block 370, the provider's workflow system receives the product data and stores it at a block 371. Blocks 372 and 373 determine if supplemental products exist. If so, then the program points to a node AAA which points to block 343 on FIG. 6B, discussed above. Whether or not supplemental products exist, a decision block 374 next determines if multiple products have been tried. If so, then tracking products are created at a block 375. Thereafter, or if multiple products were not tried, then order status is sent at a block 376. The order status is transformed and routed at a block 377. A block 378 uses the subcode and user delivery tables for determining notification methods which are then applied. The website server 32 receives the order status at a block 379. When the order status is sent at the block 376, a message is also sent to the gateway at a block 380 to terminate the process. Similarly, if a valid product was not returned from the gateway, as determined at the decision block 366, then a block 381 sends a message to the gateway to terminate the process and the routine ends.

Figure 7:
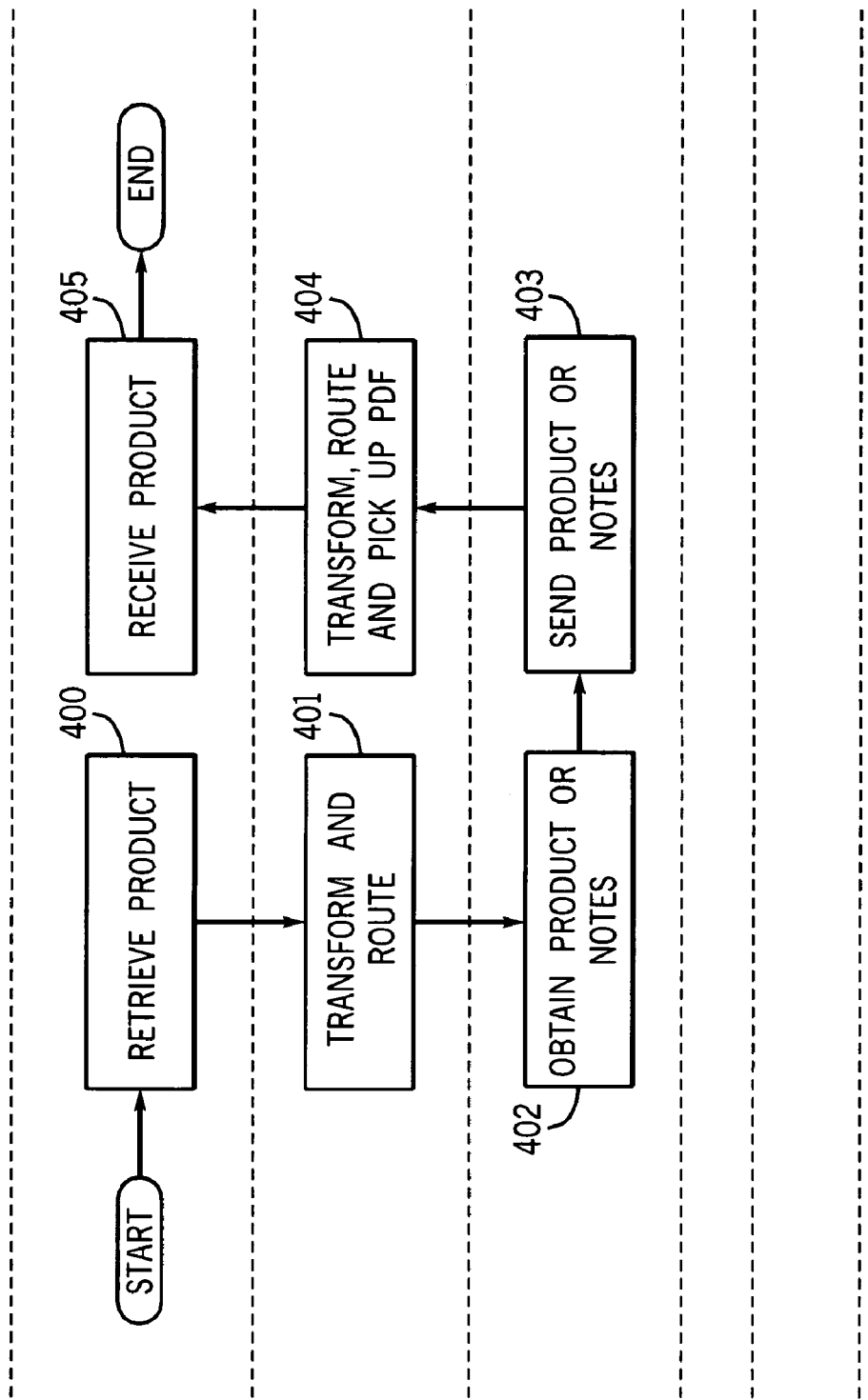
FIG. 7 comprises a flow diagram for a program for retrieving a product for a new order.

Referring to FIG. 7, a flow diagram illustrates a program for retrieving a product for a new order entered via the provider's website. This program begins at a block 400 to retrieve a product. The customer selects a link to request the product for which they received order fulfillment confirmation. The message in XML format is transformed into the provider's workflow system format and routed at a block 401. At a block 402 the provider's workflow system obtains the requested product which is then sent at a block 403 via the gateway to the website. The gateway transforms and routes the message to the website at a block 404 and the product is received at a block 405 and the routine ends.

Figure 8:
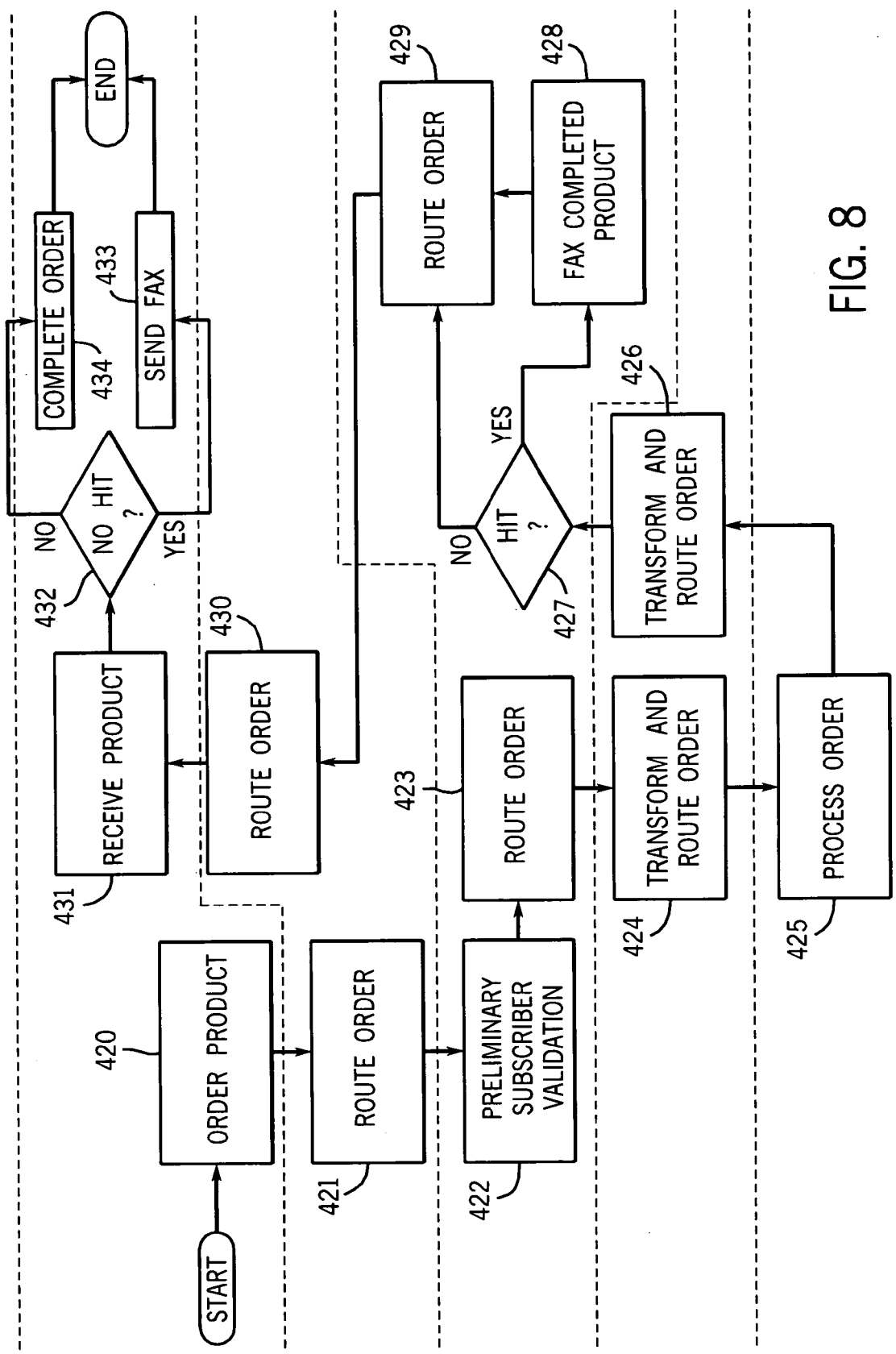
FIG. 8 comprises a flow diagram illustrating software for data entry for a new order.

FIG. 8 illustrates a flow diagram for a program for data entry for a new order using the provider's workflow system. At a block 420 a product is ordered via the provider's workflow system. The order is routed by a mailbox to a certification system at a block 421. The order is translated from the provider's workflow systems mainframe language into the certification systems non-mainframe language. The certification system ensures that the subscriber is valid at a block 422. The order is routed at a block 423 to the gateway. The gateway transforms and routes the message at a block 424 into the AVM vendor's format. The AVM vendor processes the order at a block 425. The order is transformed and routed back to the certification system at a block 426. A decision block 427 determines if a hit is returned. If so, then the completed product is faxed to the lender at a block 428. Thereafter, or if a hit was not returned, then the order is routed to the connect mailbox at a block 429. The order is routed to the provider's workflow system at a block 430 where it is received at a block 431. A decision block 432 determines if no hit was returned. If so, then a fax indicating no hit is sent to the lender at a block 433 and the program ends. If not, then the order is completed at a block 434 and the routine ends.

Figure 9:
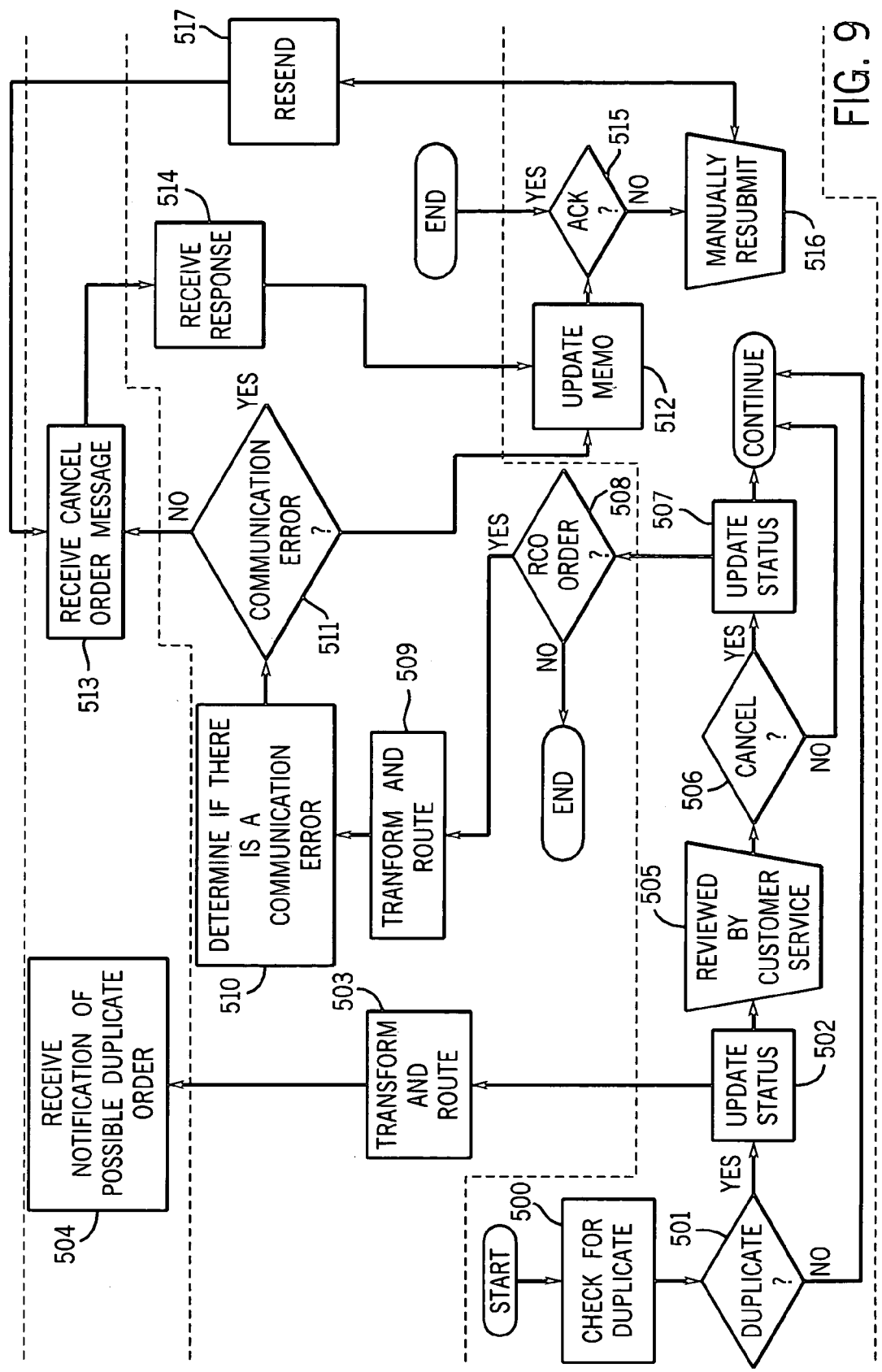
FIG. 9 illustrates a flow diagram illustrating software for a subproduct for determining if an order is a duplicate.

FIG. 9 comprises a flow diagram illustrating a duplicate subprocess. This program begins at a block 500 in the provider's workflow system which checks for duplicates. Based on the applicant's name, ID, address, and product type, points are applied. If the points are greater than 450, then the order is determined to be a duplicate. A decision block 501 determines if the order is a duplicate. If so, then the status of the order is updated at a block 502 to indicate that it is a duplicate. The gateway transforms the message from the provider's workflow system format into the lender's workflow system format or XML, depending on the order origination system, at a block 503 and routes it to the order origination system which receives the message at a block 504. Likewise, from the block 502 the order is reviewed by customer service at a block 505. The order is placed in a work queue. Customer service reviews the order and determines if it is indeed a duplicate order. The can choose to either cancel the order or resend the order to the provider's workflow system. A decision block 506 determines if the order was cancelled. If so, then status is updated at a block 507. Thereafter, or if the order was not cancelled, or the order was not a duplicate, then normal operation continues by returning to the main program. A decision block 508 determines if the order was placed through the lender's workflow system. If not, then the routine ends. If so, the gateway transforms and routes the message at a block 509. Blocks 510 and 511 determine if there is an error in communication. If so, status is updated to indicate a communication error at a block 512. If there was no communication error, then at a block 513 the order origination system receives a message from the gateway notifying it of a duplicate order. At a block 514 the gateway receives a response from the order origination system, either an ACK or NAK. The memo is then updated at the block 512. A decision block 515 determines if an ACK was sent back from the order origination system. If so, then the routine ends. If not, then the product is manually resubmitted from the provider's workflow system at a block 516. The gateway resends the message to the order origination system after receiving a negative acknowledgment of communication error at a block 517. The program then proceeds to the block 513, discussed above.

Figure 10:
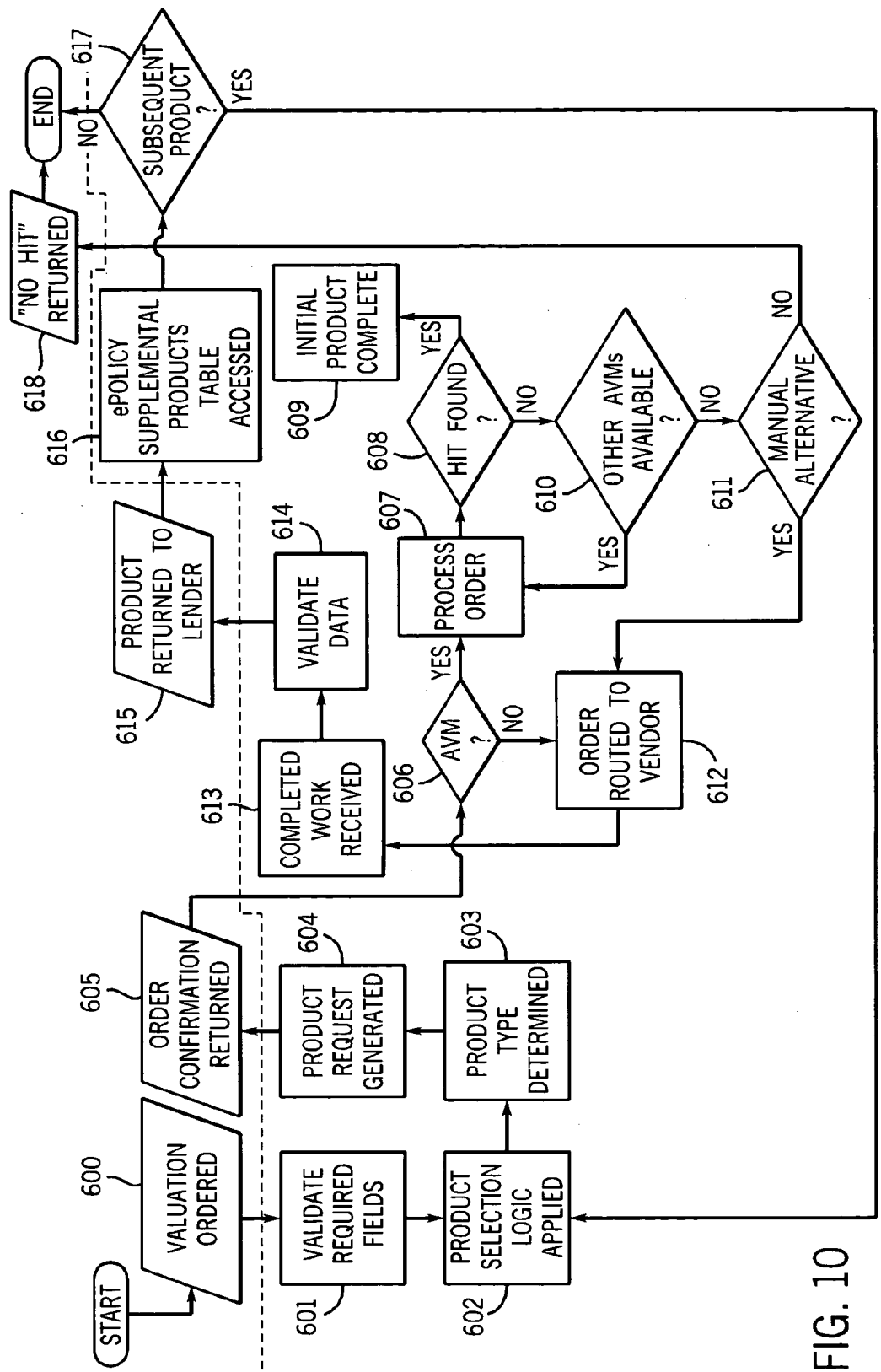
FIG. 10 is a flow diagram illustrating procedures followed by a lender utilizing the system and method in accordance with the invention.

Referring to FIG. 10, a flow diagram illustrates a flow chart for the process followed by the lender. The method begins at a block 600 where the lender orders a valuation product comprising inputting the customer's name and address and miscellaneous other information. The provider's work flow system validates the required fields at a block 601 to ensure that all required fields have been filled in. The product selection logic is applied at a block 602, as discussed above. The product type is determined at a block 603. The provider's workflow system generates a product request at a block 604 and order confirmation is returned to the lender at a block 605. A decision block 606 determines if the product selected is an AVM. If so, the order is processed at a block 607. A decision block 608 determines if a hit was found. If so, then the initial product is completed at a block 609. If a hit was not found, then a decision block 610 determines if there are other AVMs available. If so, then the program returns to the block 607. If not, then a decision block 611 determines if there are manual alternatives available. If so, the order is routed to a vendor to be completed at a block 612. Similarly, if the product selection was not an AVM, as determined at the decision block 606, then the order is likewise routed to the vendor of the block 612. When the completed work is received at a block 613, the data is validated at a block 614 by checking data against any prior orders for inconsistencies. The product is returned to the lender at a block 615. An ePolicy supplemental products table is accessed at a block 616. A decision block 617 determines if any subsequent products are required. If so, then the program returns to the block 602. If not, the routine ends.

Finally, if there was no manual alternative available, as determined at the decision block 611, then a not hit message is returned to the lender at a block 618 and the routine ends.

As described, the system 20 and related method automates the logic implemented by a loan underwriter, saving the loan originator time and money. Each lending institution can set up its own decisioning criteria, enabling customers to customize the process in which a property evaluation, owners and encumbrance report, or title product is selected for a loan application within a given set of characteristics. The system and method allow for the automatic upgrading to another product without involvement of the loan processor, helping to reduce time delays in the loan origination process. The speed and automation allow for more underwriting checks to be applied against each loan.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

As described above, a loan underwriting method in accordance with one aspect of the invention comprises obtaining a lenders credit policy for ordering valuation and title products and defining a policy table cross referencing a lenders credit policy to valuation and title products. The policy table utilizes underwriting criteria including property location, loan amount, borrower risk tier and transaction level borrower and loan data. The policy table is stored in a memory device. A workflow system is operated, comprising receiving orders for valuation and title products, each order including information about a borrowers transaction, processing the order by reading the policy table from the memory device and comparing the information to underwriting criteria to automatically select a valuation or title product, directly ordering the selected valuation or title product for processing, and delivering the processed valuation or title product to the lender.

The selected valuation product may comprise an AVM, including a cascaded AVM, or may comprise a manual product such as a drive by valuation or a full appraisal.

A loan underwriting method in accordance with another aspect of the invention comprises obtaining a lenders credit policy for ordering valuation products, and defining a policy table cross referencing a lenders credit policy to valuation products utilizing underwriting criteria, the valuation products comprising a plurality of select automated valuation models (AVMS) and a cascaded AVM, the cascaded AVM comprising a sequence of the select AVMs, the policy table assigning a select confidence score minimum to each of the select AVMs. The policy table is stored in a memory device. A workflow system is operated comprising receiving orders for valuation products, each order including information about a borrowers transaction, processing the order by reading the policy table from the memory device and comparing the information to underwriting criteria to automatically select a valuation or title product, directly ordering the selected valuation or title product for processing, and delivering the processed valuation or title product to the lender.

A loan underwriting method in accordance with still another aspect of the invention comprises obtaining a lenders credit policy for ordering valuation and title products and defining a policy table cross referencing a lenders credit policy to valuation and title products, the policy table utilizing select underwriting criteria. The policy table is stored in a memory device. A workflow system is operated comprising receiving orders for valuation and title products, each order including information about a borrowers transaction, processing the order by reading the policy table from the memory device and comparing the information to underwriting criteria to automatically select a valuation or title product, directly ordering the selected valuation or title product for processing, comparing the processed valuation or title product and the information about a borrowers transaction to the underwriting criteria to automatically order upgrade products, and delivering the processed valuation or title product and upgrade products to the lender.

Thus, in accordance with the invention there is described a system and method for loan underwriting that ensures that the most appropriate product, based on risk, is always ordered.

I claim:

1. A loan underwriting method comprising:

obtaining a lender's criteria for ordering valuation and title products, the criteria being related to the creditworthiness of a loan applicant, defining a policy table cross referencing said criteria for ordering valuation and title products to actual valuation and title products, the policy table additionally referencing underwriting criteria including property location, loan amount, borrower risk tier and transaction level borrower and loan data;

storing said policy table in a memory device;

operating a workflow system comprising:

receiving orders for valuation and title products, each order including information about a borrower's transaction;

processing each order by automatically selecting a valuation or title product through reading said policy table from the memory device and comparing said information about a borrower's transaction to said underwriting criteria;

directly ordering the selected valuation or title product for processing; and delivering the processed valuation or title product to the lender.

2. The loan underwriting method of claim 1 wherein the valuation products comprise a plurality of select automated valuation models (AVMs) and a cascaded AVM, wherein a cascaded AVM comprises a sequence of the select AVMs.

3. The loan underwriting method of claim 2 wherein operating the workflow system further comprises receiving results from a vendor of AVM products if the selected valuation product comprises a select AVM.

4. The loan underwriting method of claim 2 wherein operating the workflow system further comprises sequentially receiving results from vendors of AVM products if the selected valuation product comprises a cascaded AVM until one of the vendors returns an automated property value.

5. The loan underwriting method of claim 2 wherein defining the policy table further comprises assigning a select confidence score minimum to each of the select AVMs.

6. The loan underwriting method of claim 5 wherein operating the workflow system further comprises sequentially receiving results from vendors of AVM products if the selected valuation product comprises a cascaded AVM until one of the vendors returns an automated property value and a confidence score above the select confidence score minimum for the select AVM returning the automated property value.

7. The loan underwriting method of claim 1 wherein the actual valuation and title products further comprise upgrade products and wherein operating a workflow system further comprises automatically ordering upgrade products after comparing the processed valuation or title product and the information about a borrower's transaction to the underwriting criteria.

8. A loan underwriting method comprising:
obtaining a lender's criteria for ordering valuation products, the criteria being related to the creditworthiness of a loan applicant,
defining a policy table cross referencing said criteria for ordering valuation products to actual valuation products, and additionally referencing underwriting criteria, the valuation products comprising
a plurality of select automated valuation models (AVMs) and a cascaded AVM, the cascaded AVM comprising
a sequence of the select AVMs, the policy table assigning a select confidence score minimum to each of the select AVMs;
storing the policy table in a memory device;
operating a workflow system comprising
receiving orders for valuation and title products, each order including information about a borrower's transaction;
processing each order by automatically selecting a valuation product through reading said policy table from the memory device and comparing said information about a borrower's transaction to said underwriting criteria;
directly ordering the selected valuation product for processing; and
delivering the processed valuation or title product to the lender.

9. The loan underwriting method of claim 8 wherein operating the workflow system further comprises sequentially receiving results from vendors of AVM products if the selected valuation product comprises a cascaded AVM until one of the vendors returns an automated property value.

10. The loan underwriting method of claim 8 wherein operating the workflow system further comprises sequentially receiving results from vendors of AVM products if the selected valuation product comprises a cascaded AVM until one of the vendors returns an automated property value and a confidence score above the select confidence score minimum for the select AVM returning the automated property value.

11. The loan underwriting method of claim 8 wherein the actual valuation products further comprise upgrade products and wherein operating a workflow system further comprises automatically ordering upgrade products after comparing the processed valuation product and the information about a borrower's transaction to the underwriting criteria.

12. A loan underwriting method comprising:
obtaining a lender's criteria for ordering valuation and title products, the criteria being related to the creditworthiness of a loan applicant,
defining a policy table cross referencing said criteria for ordering valuation and title products to actual valuation and title products, the policy table additionally referencing select underwriting criteria;
storing the policy table in a memory device;
operating a workflow system comprising:
receiving orders for valuation and title products, each order including information about a borrower's transaction;
processing each order by automatically selecting a valuation or title product through reading said policy table from the memory device and comparing said information about a borrower's transaction to said underwriting criteria;
directly ordering the selected valuation or title product for processing;
automatically ordering upgrade valuation and title products after comparing the processed valuation or title product and the information about a borrower's transaction to the underwriting criteria; and
delivering the processed valuation or title product and upgrade products to the lender.

13. The loan underwriting method of claim 12 wherein the valuation products comprise a plurality of select automated valuation models (AVMs) and a cascaded AVM, wherein a cascaded AVM comprises a sequence of the select AVMs.

14. The loan underwriting method of claim 13 wherein operating the workflow system further comprises receiving results from a vendor of AVM products if the selected valuation product comprises a select AVM.

15. The loan underwriting method of claim 13 wherein operating the workflow system further comprises sequentially receiving results from vendors of AVM products if the selected valuation product comprises a cascaded AVM until one of the vendors returns an automated property value.

16. The loan underwriting method of claim 13 wherein defining the policy table further comprises assigning a select confidence score minimum to each of the select AVMs.

17. The loan underwriting method of claim 16 wherein operating the workflow system further comprises sequentially receiving results from vendors of AVM products if the selected valuation product comprises a cascaded AVM until one of the vendors returns an automated property value and a confidence score above the select confidence score minimum for the select AVM returning the automated property value.

18. A loan underwriting system comprising:
a database storing a policy table cross referencing a lender's criteria for ordering valuation and title products based on the creditworthiness of a loan applicant to actual valuation and title products, the policy table additionally referencing underwriting criteria including property location, loan amount, borrower risk tier and transaction level borrower and loan data;

a workflow processing system operatively associated with the database and programmed for:
receiving orders for valuation and title products, each order including information about a borrower's transaction;
processing each order by automatically selecting a valuation or title product through reading the policy table from the database and comparing said information about a borrower's transaction to underwriting criteria;
directly ordering the selected valuation or title product for processing; and
delivering the processed valuation or title product to the lender.

19. The loan underwriting system of claim 18 further comprising a network server operatively connected to the workflow processing system providing a user interface to the loan underwriting system.

20. The loan underwriting system of claim 18 further comprising a website server operatively connected to the workflow processing system providing a user interface to the loan underwriting system.

21. The loan underwriting system of claim 18 wherein the valuation products comprise a plurality of select automated valuation models (AVMs) and a cascaded AVM, wherein a cascaded AVM comprises a sequence of the select AVMs.

22. The loan underwriting system of claim 21 wherein the workflow processing system is further programmed to sequentially receive results from vendors of AVM products if the selected valuation product comprises a cascaded AVM until one of the vendors returns an automated property value.

23. The loan underwriting system of claim 21 wherein the policy table further comprises a select confidence score minimum assigned to each of the select AVMs.

24. The loan underwriting system of claim 23 wherein the workflow processing system is further programmed to sequentially receive results from vendors of AVM products if the selected valuation product comprises a cascaded AVM until one of the vendors returns an automated property value and a confidence score above the select confidence score minimum for the select AVM returning the automated property value.

25. The loan underwriting system of claim 18 wherein the valuation and title products further comprise upgrade products and wherein the workflow processing system is further programmed for automatically ordering upgrade products after comparing the processed valuation or title product and the information about a borrower's transaction to the underwriting criteria.

* * * * *